United States Patent
Komori et al.

(10) Patent No.: US 9,905,337 B2
(45) Date of Patent: Feb. 27, 2018

(54) SEALING STRUCTURE OF MULTICORE CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Mie (JP); Hiroki Hirai, Mie (JP); Tomoyuki Sakata, Mie (JP); Makoto Higashikozono, Mie (JP); Masato Tsutsuki, Mie (JP)

(73) Assignees: AUTONETOWKRS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/317,290

(22) PCT Filed: Dec. 25, 2014

(86) PCT No.: PCT/JP2014/084297
§ 371 (c)(1),
(2) Date: Dec. 8, 2016

(87) PCT Pub. No.: WO2015/198506
PCT Pub. Date: Dec. 30, 2015

(65) Prior Publication Data
US 2017/0117070 A1 Apr. 27, 2017

(30) Foreign Application Priority Data
Jun. 26, 2014 (JP) .................................. 2014-131702

(51) Int. Cl.
*H01B 7/282* (2006.01)
*H02G 15/08* (2006.01)
(Continued)

(52) U.S. Cl.
CPC .......... *H01B 7/282* (2013.01); *H02G 15/013* (2013.01); *H02G 15/08* (2013.01); *B60R 16/0215* (2013.01)

(58) Field of Classification Search
None
See application file for complete search history.

(56) References Cited

U.S. PATENT DOCUMENTS 1,590,413 A * 6/1926 Bol et al. ................. H01J 19/38
174/50.61
3,806,628 A * 4/1974 Higgins ................. H01B 7/009
174/112
(Continued)

FOREIGN PATENT DOCUMENTS

CN 103329377 9/2013
GB 2285715 7/1995
(Continued)

OTHER PUBLICATIONS

International Search Report (ISR) issued in Japan Patent Application No. PCT/JP2014/084297, dated Mar. 3, 2015.
(Continued)

*Primary Examiner* — Dimary Lopez Cruz
*Assistant Examiner* — Muhammed Azam
(74) *Attorney, Agent, or Firm* — Greenblum & Bernstein, P.L.C.

(57) ABSTRACT

A sealing structure of a multicore cable includes the multicore cable, a rubber stopper, a cap, and a holder. The multicore cable includes first to fourth electric wires covered with a sheath. The rubber stopper is fitted on an end of the
(Continued)

sheath and first to fourth through holes through which the first to the fourth electric wires are passed, respectively. The cap is fitted on the rubber stopper and presses the rubber stopper inward. The holder includes a sheath holding portion for holding the sheath and a cap holding portion for holding the cap.

8 Claims, 23 Drawing Sheets

(51) Int. Cl.
*H02G 15/013* (2006.01)
*B60R 16/02* (2006.01)

(56) References Cited

U.S. PATENT DOCUMENTS

| | | | | |
|---|---|---|---|---|
| 3,816,642 | A * | 6/1974 | Toedtman | H02G 15/192 174/138 F |
| 4,732,628 | A * | 3/1988 | Dienes | H02G 15/18 156/48 |
| 5,310,963 | A * | 5/1994 | Kennelly | H02G 15/04 174/650 |
| 5,618,880 | A * | 4/1997 | Okazaki | B60R 16/0222 524/731 |
| 5,639,993 | A * | 6/1997 | Ideno | B60R 16/0222 174/153 G |
| 5,750,933 | A * | 5/1998 | Brady | H02G 15/007 174/135 |
| 5,886,300 | A * | 3/1999 | Strickler | G02B 6/4444 174/135 |
| 7,232,347 | B1 * | 6/2007 | Moore | H02G 15/013 174/89 |
| 8,872,027 | B2 * | 10/2014 | Proud | H02G 15/013 174/653 |
| 9,029,701 | B2 | 5/2015 | Hara | |
| 9,515,467 | B2 * | 12/2016 | Nakai | H02G 3/0691 |
| 9,561,758 | B2 * | 2/2017 | Wakabayashi | B60R 16/0215 |
| 9,566,919 | B2 * | 2/2017 | Kushima | H02G 3/0481 |
| 9,601,914 | B2 * | 3/2017 | Chiu | H02G 15/007 |
| 2003/0226680 | A1 * | 12/2003 | Jackson | H02G 15/04 174/655 |
| 2007/0102187 | A1 * | 5/2007 | Kundinger | H01B 11/1033 174/105 R |
| 2007/0102188 | A1 * | 5/2007 | Glew | H01B 7/295 174/113 C |
| 2010/0096158 | A1 * | 4/2010 | Wheatley | H02G 3/0625 174/68.1 |
| 2011/0079423 | A1 * | 4/2011 | Zhao | A61N 1/056 174/5 R |
| 2011/0130035 | A1 * | 6/2011 | Ebihara | H01R 13/5205 439/587 |
| 2011/0159731 | A1 * | 6/2011 | Kataoka | B60R 16/0207 439/604 |
| 2013/0105219 | A1 * | 5/2013 | Osawa | H01R 13/5208 174/77 R |
| 2013/0233615 | A1 * | 9/2013 | Pimentel | G02B 6/4477 174/650 |
| 2013/0269970 | A1 | 10/2013 | Hara | |
| 2014/0096992 | A1 * | 4/2014 | Williams | E21B 33/04 174/20 |
| 2015/0075862 | A1 * | 3/2015 | Oka | H01R 4/20 174/72 A |
| 2015/0155079 | A1 * | 6/2015 | Martins Neto | H02G 15/013 174/153 R |
| 2015/0200531 | A1 * | 7/2015 | Chiu | F16J 15/022 277/607 |
| 2015/0243411 | A1 * | 8/2015 | Maeda | H01B 7/423 174/47 |
| 2015/0288164 | A1 * | 10/2015 | O'Sullivan | H02G 15/04 174/77 R |
| 2016/0336097 | A1 * | 11/2016 | Sakagami | H02G 15/013 |

FOREIGN PATENT DOCUMENTS

| | | |
|---|---|---|
| GB | 2425365 | 10/2006 |
| JP | 5-198335 | 8/1993 |
| JP | 2003-189455 | 7/2003 |
| JP | 2011-113938 | 6/2011 |
| JP | 2012-182924 | 9/2012 |
| JP | 2013-97898 | 5/2013 |
| JP | 2013-134944 | 7/2013 |

OTHER PUBLICATIONS

Office Action issued in Japan Counterpart Patent Appl. No. 2016-515568, dated Jun. 7, 2016 , along with an english translation thereof.

Office Action issued in Japan Counterpart Patent Appl. No. 2016-515568, dated Sep. 1, 2016 , along with an english translation thereof.

Written Opinion of the International Searching Authority issued in Japan Patent Application No. PCT/JP2014/084297, dated Mar. 3, 2015.

Office Action issued in China Counterpart Patent Appl. No. 201480080101.2, dated Aug. 17, 2017 , along with an English translation thereof.

* cited by examiner

SEALING STRUCTURE OF MULTICORE CABLE

TECHNICAL FIELD

The present invention relates to a sealing structure of a multicore cable.

BACKGROUND ART

Conventionally, a terminal water blocking structure for a multicore cable disclosed in JP2012-182924A (Patent Document 1) has been known. The multicore cable includes electric wires covered with a sheath made of insulating resin. Portions of the electric wires pulled out of an end of the multicore cable are protected from moisture by a hot melt block that includes partitions arranged among the electric wires for separating the electric wires from one another and melted by heating while the partitions are arranged among the electric wires to fill among the electric wires.

CITATION LIST

Patent Documents

Patent Document 1: JP 2012-182924A

However, with the above-mentioned configuration, time for heating and melting a hot melt adhesive is required. Namely, there is a problem that work efficiency decreases.

A virtual technology for sealing spaces among electric wires from moisture by attaching a sealing member to an end of a sheath of a multicore cable may be considered. Such a sealing member may include a rubber stopper fitted on the end of the sheath and a cap fitted on the rubber stopper and pressing the rubber stopper against the sheath and the electric wires. With the rubber stopper pressed against the sheath and the electric wires by the cap, it is expected that water is blocked at a branching point of the multicore cable at which the electric wires are branched off so as not to enter into the sheath Furthermore, according to the virtual technology, time for melting the hot melt adhesive is not required. Therefore, it is expected that work efficiency can be improved.

However, according to the virtual technology, when a force is applied to the electric wires or the cap, the cap may become off from a proper fitting position relative to the rubber stopper and thus a sufficient pressure may not be applied to the rubber stopper. As a result, the rubber stopper is not sufficiently held against the sheath or the electric wires and thus water may enter between the rubber stopper and the sheath or between the rubber stopper and the electric wires.

The technique described in the specification was made based on the foregoing circumstances.

According to one aspect of the technique described in the specification, a sealing structure of a multicore cable includes: the multicore cable including electric wires covered with a sheath; a rubber stopper fitted on an end of the sheath and including through holes through which the electric wires are passed, respectively; a cap fitted on the rubber stopper and pressing the rubber stopper inward; and a holder including a sheath holding portion for holding the sheath and a cap holding portion for holding the cap.

With this aspect of the technique described in the specification, a relative position between the sheath and the cap is maintained by holding the sheath with the sheath holding portion and the cap with the cap holding portion. Therefore, the rubber stopper is properly pressed against the sheath and the electric wires by the cap. As a result, a portion of the multicore cable at a branching point at which the electric wires are branched off is properly sealed.

DESCRIPTION OF EMBODIMENTS

Embodiment 1

Figure 1:
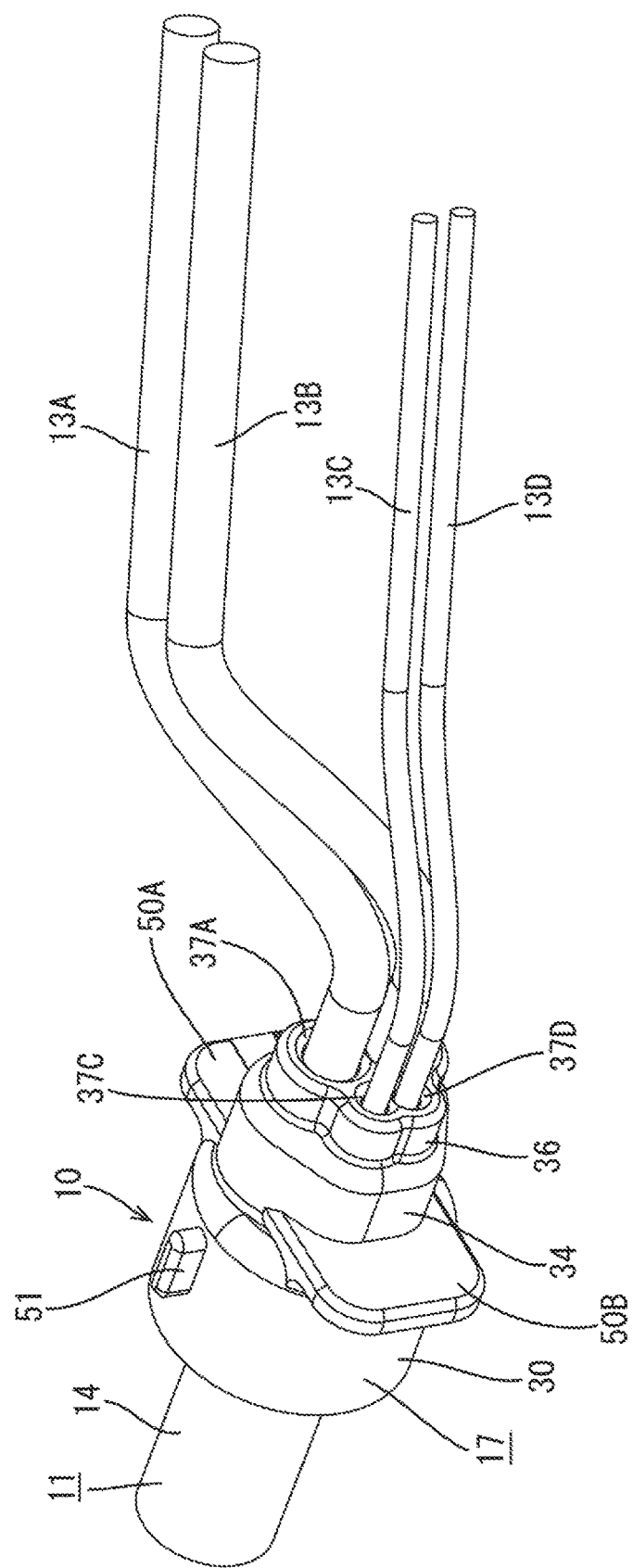
FIG. 1 is a perspective view of a multicore cable with a sealing member attached thereto according to Embodiment 1 of the present invention.
Figure 2:
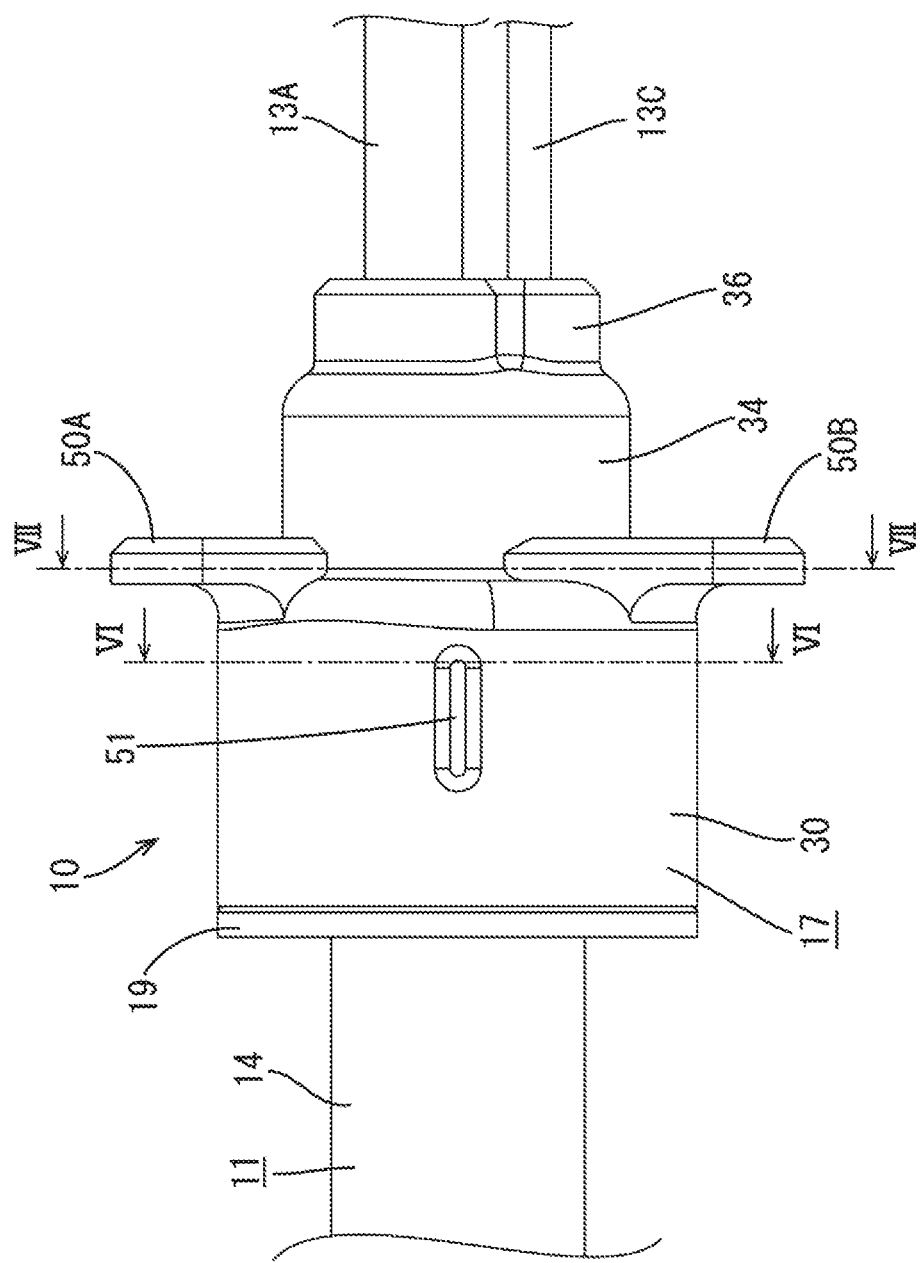
FIG. 2 is a plan view of the multicore cable with the sealing member attached thereto.

Embodiment 1 in which an aspect of the present invention is applied to a sealing structure 12 of a multicore cable 11 will be described with reference to FIGS. 1 to 21. This embodiment may be used for a wire harness for an electric parking brake installed in a vehicle (not illustrated), for example. As illustrated in FIG. 15, the sealing structure 12 includes the multicore cable 11, a rubber stopper 15, a cap 17, and a holder 52. The rubber stopper 15 is fitted on an end 14A of a sheath 14 of the multicore cable 11. The cap 17 is fitted on the rubber stopper 15. The holder 52 holds the multicore cable 11 and the cap 17. It should be noted that in the following description, the upper side of FIG. 6 is referred to as "the upper side", and the lower side thereof is referred to as "the lower side."

Multicore Cable 11

As illustrated in FIGS. 1 to 4, the multicore cable 11 according to this embodiment includes electric wires 13A, 13B, 13C and 13D (four wires in this embodiment) wrapped in the sheath 14 made of synthetic resin having insulating properties. The electric wires 13A, 13B, 13C and 13D include metal core wires (not illustrated) and synthetic resin insulating jackets (not illustrated) covering outer peripheries of the metal core wires, respectively. A cross section of the multicore cable 11 has a round shape.

Figure 6:
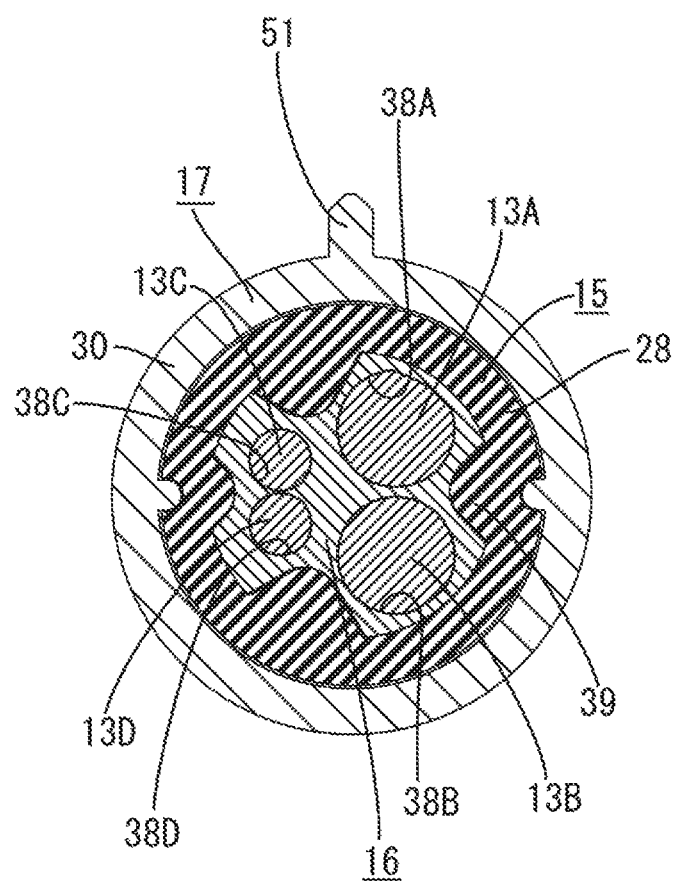
FIG. 6 is a cross-sectional view along line VI-VI in FIG. 2.
Figure 7:
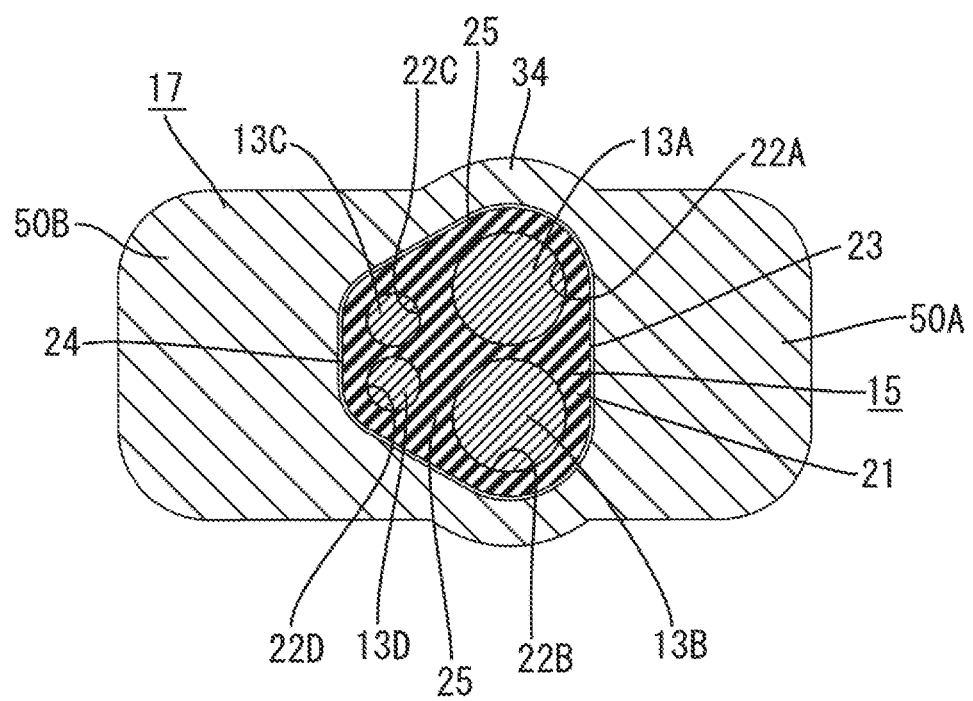
FIG. 7 is a cross-sectional view along line VII-VII in FIG. 2.

As illustrated in FIGS. 6 and 7, four electric wires 13A, 13B, 13C and 13D include two types of the electric wires 13A, 13B, 13C and 13D having different outer diameters. This embodiment includes the first electric wire 13A and the second electric wire 13B configured to be connected to a motor for the electric parking brake and the third electric wire 13C and the fourth electric wire 13D configured to be connected to a sensor for an antilock braking system. The first electric wire 13A, the second electric wire 13B, the third electric wire 13C, and the fourth electric wire 13D have cross sections that are round.

The outer diameters of the first electric wire 13A and the second electric wire 13B are defined larger than the outer diameters of the third electric wire 13C and the fourth electric wire 13D. The outer diameter of the first electric wire 13A and the outer diameter of the second electric wire 13B are defined equal. The outer diameter of the third electric wire 13C and the outer diameter of the fourth electric wire 13D are defined equal. The first electric wire 13A, the second electric wire 13B, the third electric wire 13C, and the fourth electric wire 13D are pulled out of the end 14A of the sheath 14 of the multicore cable 11 and branched off.

Sealing Member 10

As illustrated in FIGS. 1 to 4, the sealing member 10 is attached to the end 14A of the sheath 14 of the multicore cable 11 at which the first electric wire 13A, the second electric wire 13B, the third electric wire 13C, and the fourth electric wire 13D are branched off. With the sealing member 10, liquid such as water and oil is restricted from entering into the sheath 14 through the end 14A of the sheath 14. The sealing member 10 includes the rubber stopper 15 fitted on the end 14A of the sheath 14, the guide member 16 attached inside the rubber stopper 15, and the cap 17 fitted on the rubber stopper 15.

Rubber Stopper 15

Figure 3:
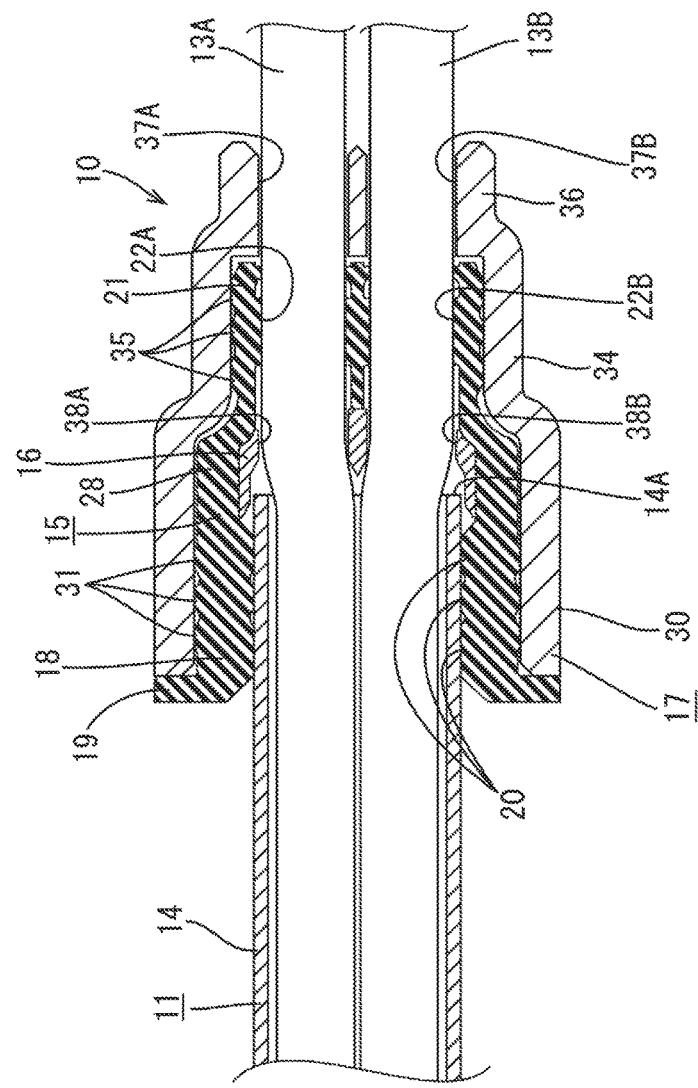
FIG. 3 is a cross-sectional view along line III-III in FIG. 5.
Figure 4:
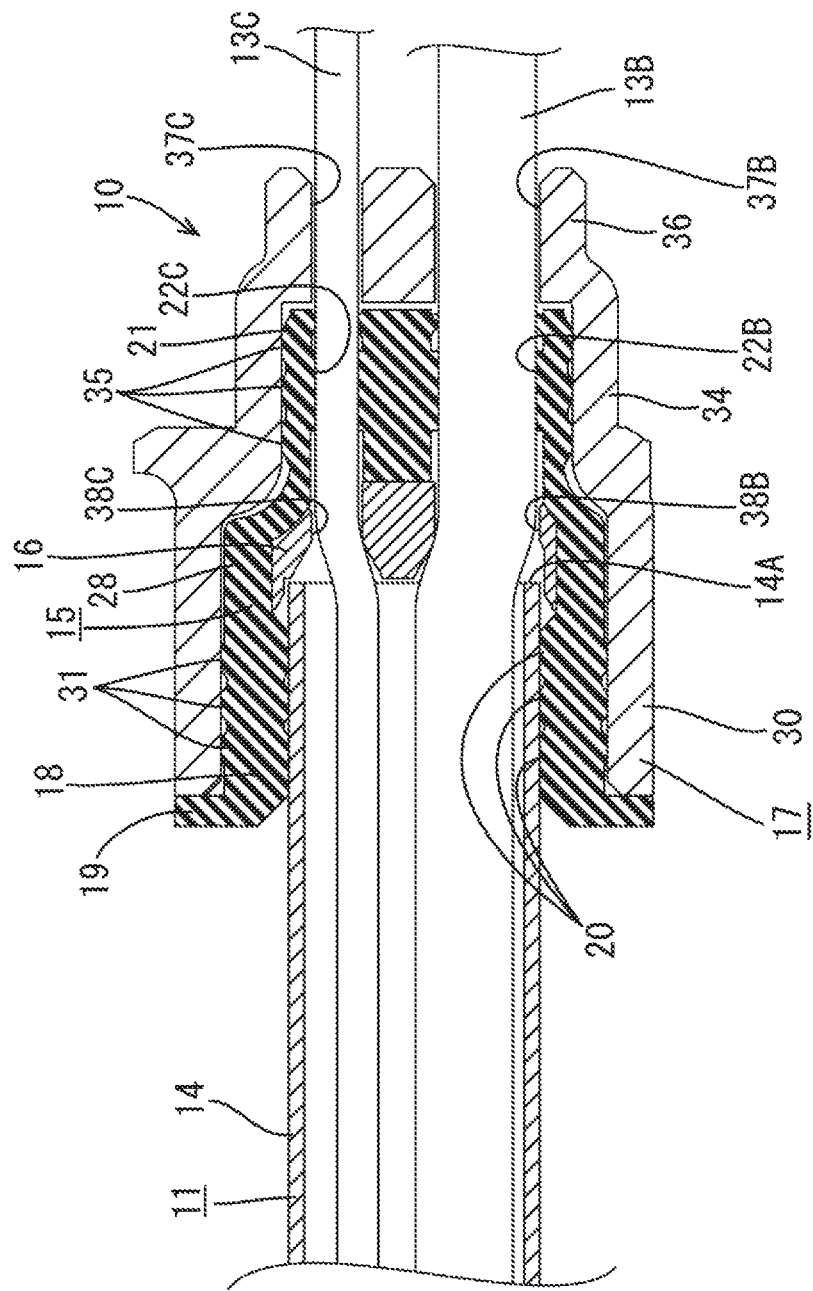
FIG. 4 is a cross-sectional view along line IV-IV in FIG. 5.
Figure 5:
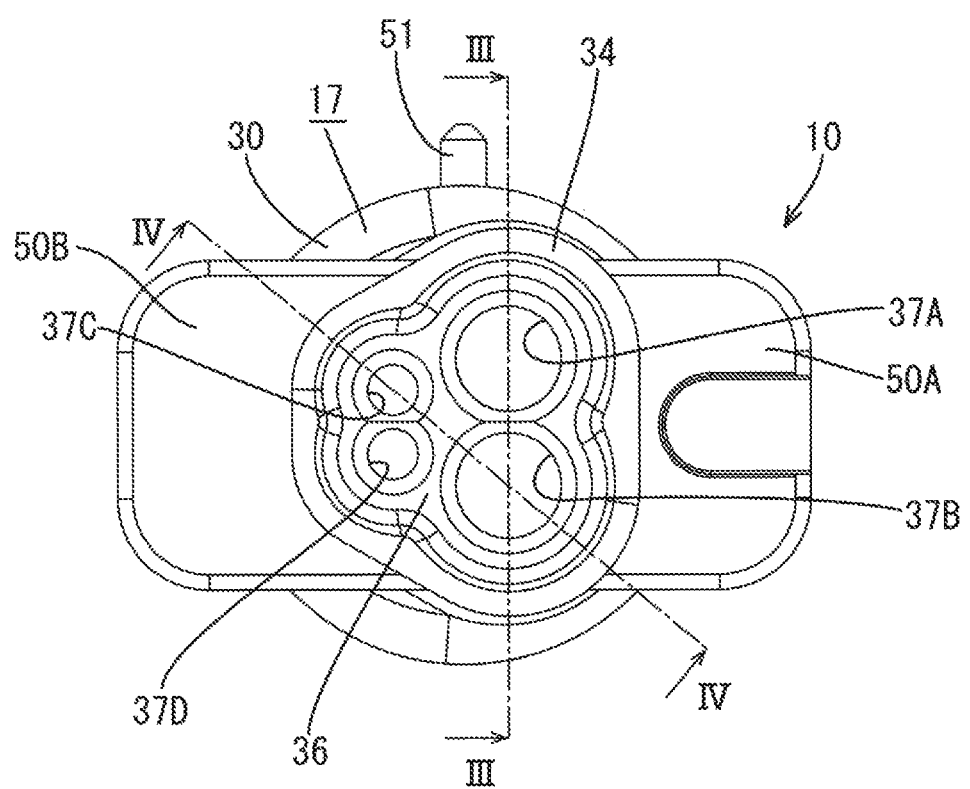
FIG. 5 is a front view of the sealing member.

As illustrated in FIGS. 3 and 4, the rubber stopper 15 is fitted on the end 14A of the sheath 14. The rubber stopper 15 includes a sheath fitting portion 18 that is fitted on the end 14A of the sheath 14. The sheath fitting portion 18 is formed in a hood shape that extends to a side opposite to the end 14A of the sheath 14 (to the left in FIG. 3) and opens toward the side opposite to the end 14A of the sheath 14 (toward the left in FIG. 3). A flange 19 is formed at an edge of the sheath fitting portion 18. The flange 19 projects outward in a radial direction of the sheath fitting portion 18. The sheath fitting portion 18 practically has a round tubular shape when it is in a natural state.

Sheath-Side Lip 20

Figure 8:
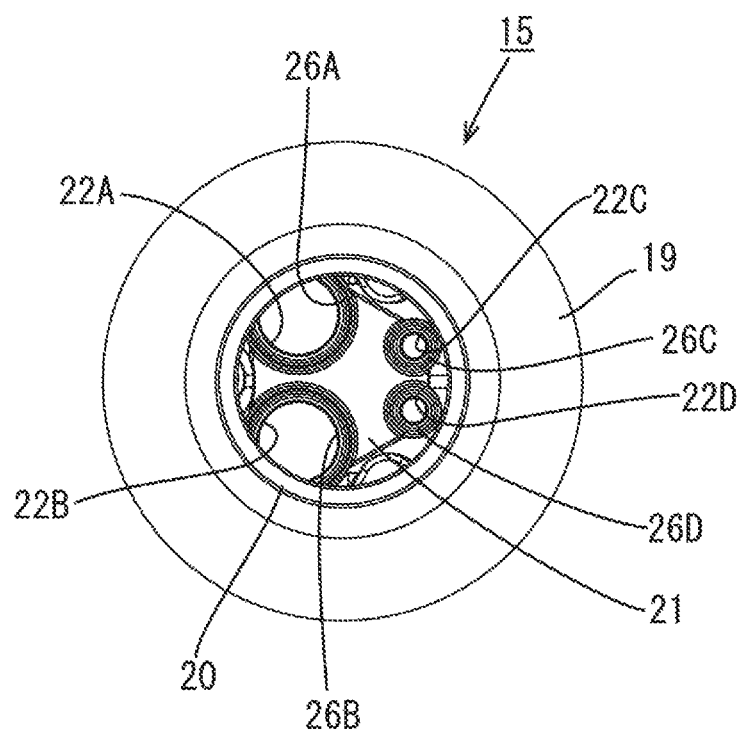
FIG. 8 is a rear view illustrating a rubber stopper.

As illustrated in FIGS. 3, 4 and 8, sheath-side lips 20 that project inward are formed on an inner periphery of the sheath fitting portion 18 annularly along the circumferential direction of the sheath fitting portion 18. When the sheath fitting portion 18 is fitted on the end 14A of the sheath 14, the sheath-side lips 20 are in close contact with the outer periphery of the sheath 14. According to the configuration, space between the rubber stopper 15 and the sheath 14 is sealed.

Wire Through Portion 21

Figure 9:
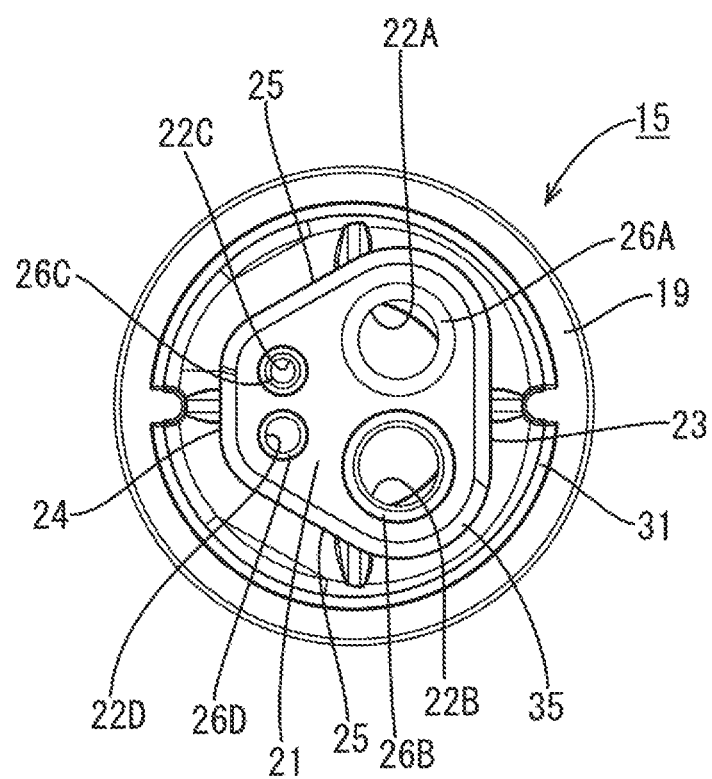
FIG. 9 is a front view illustrating a rubber stopper.

As illustrated in FIGS. 3, 4 and 9, the rubber stopper 15 includes a wire through portion 21 at an end opposite from the sheath fitting portion 18. The wire through portion 21 includes through holes 22A, 22B, 22C and 22D (four through holes in this embodiment) through which the first electric wire 13A, the second electric wire 13B, the third electric wire 13C, and the fourth electric wire 13D are passed, respectively. The through holes 22A, 22B, 22C and 22D include the first through hole 22A through which the first electric wire 13A is passed, the second through hole 22B through which the second electric wire 13B is passed, the third through hole 22C through which the third electric wire 13C is passed, and the fourth through hole 22D through which the fourth electric wire 13D is passed.

As illustrated in FIG. 9, the wire through portion 21 has a cross section in a trapezoid shape with rounded corners. The cross section of the wire through portion 21 includes a long side 23, a short side 24 that is parallel to the long side 23 and shorter than the long side, and two oblique sides 25 that connect ends of the long side 23 to ends of the short side.

The first through hole 22A and the second through hole 22B are formed side by side in a direction in which the long side 23 extends (the vertical direction in FIG. 9) in a portion of the wire through portion 21 closer to the long side 23. The third through hole 22C and the fourth through hole 22D are formed side by side in a direction in which the short side 24 extends (the vertical direction in FIG. 9) in a portion of the wire through portion 21 closer to the short side 24.

Figure 10:
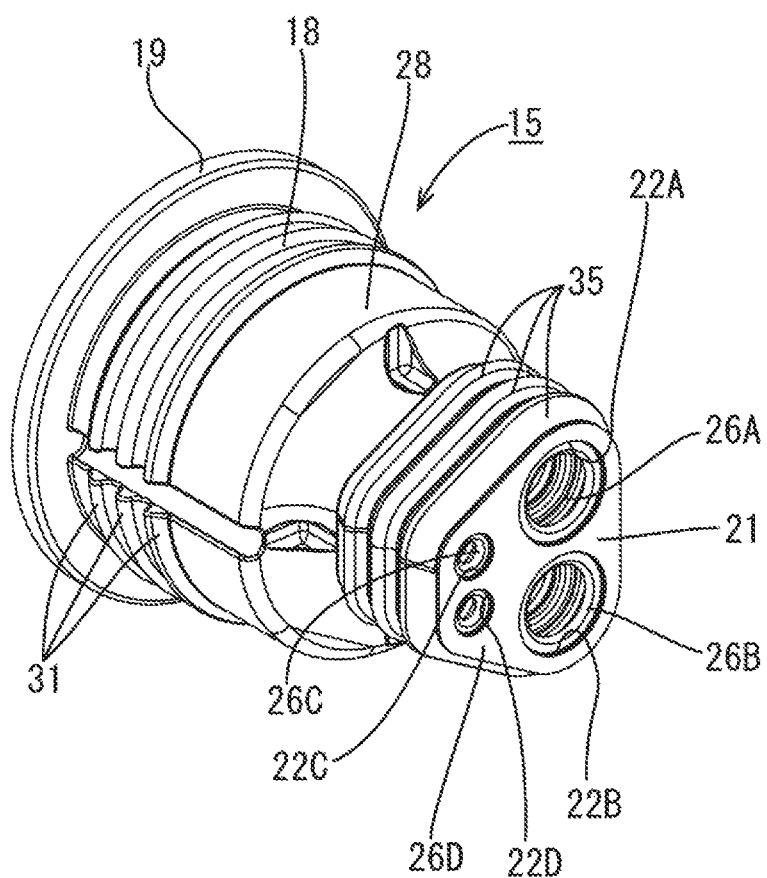
FIG. 10 is a perspective view illustrating the rubber stopper.

An inner diameter of the first through hole 22A is slightly larger than an outer diameter of the first electric wire 13A. As illustrated in FIGS. 9 and 10, a first electric wire-side lip 26A is formed on an inner periphery of the first through hole 22A annularly along the circumferential direction of the first through hole 22A. The first electric wire-side lip 26A is in close contact with the outer periphery of the first electric wire 13A when the first electric wire 13A is passed through the first through hole 22A. According to the configuration, space between the first electric wire 13A and the rubber stopper 15 is sealed.

An inner diameter of the second through hole 22B is slightly larger than an outer diameter of the second electric wire 13B. As illustrated in FIGS. 9 and 10, a second electric wire-side lip 26B is formed on an inner periphery of the second through hole 22B annularly along the circumferential direction of the second through hole 22B. The second electric wire-side lip 26B is in close contact with the outer periphery of the second electric wire 13B when the second electric wire 13B is passed through the second through hole 22B. According to the configuration, space between the second electric wire 13B and the rubber stopper 15 is sealed.

An inner diameter of the third through hole 22C is slightly larger than an outer diameter of the third electric wire 13C. As illustrated in FIGS. 9 and 10, a third electric wire-side lip 26C is formed on an inner periphery of the third through hole 22C annularly along the circumferential direction of the third through hole 22C. The third electric wire-side lip 26C is in close contact with the outer periphery of the third electric wire 13C when the third electric wire 13C is passed through the third through hole 22C. According to the configuration, space between the third electric wire 13C and the rubber stopper 15 is sealed.

An inner diameter of the fourth through hole 22D is slightly larger than an outer diameter of the fourth electric wire 13D. As illustrated in FIGS. 9 and 10, a fourth electric wire-side lip 26D is formed on an inner periphery of the fourth through hole 22D annularly along the circumferential direction of the fourth through hole 22D. The fourth electric wire-side lip 26D is in close contact with the outer periphery of the fourth electric wire 13D when the fourth electric wire 13D is passed through the fourth through hole 22D. According to the configuration, space between the fourth electric wire 13D and the rubber stopper 15 is sealed.

As illustrated in FIGS. 3 and 4, the rubber stopper 15 includes a holding portion 28 between the sheath-side lip 20 and the wire through portion 21 in the sheath fitting portion 18. The holding portion 18 is for holding the guide member 16 that includes guide holes 38A, 38B, 38C and 38D through which the first electric wire 13A, the second electric wire 13B, the third electric wire 13C, and the fourth electric wire 13D are passed, respectively (four holes in this embodiment).

Cap 17

As illustrated in FIGS. 3 and 4, the cap 17 made of synthetic resin is fitted on the rubber stopper 15. The cap 17 is fitted on the rubber stopper 15 from a side at which the first electric wire 13A, the second electric wire 13B, the third electric wire 13C, and the forth electric wire 13D are pulled out of the end 14A of the sheath 14 (from the right in FIG. 3). The cap 17 opens from the side at which the first electric wire 13A, the second electric wire 13B, the third electric wire 13C, and the forth electric wire 13D are pulled out toward the sheath 14 (toward the left in FIG. 3). An opening edge of the cap 17 is in contact with the flange 19 of the rubber stopper 15.

Figure 11:
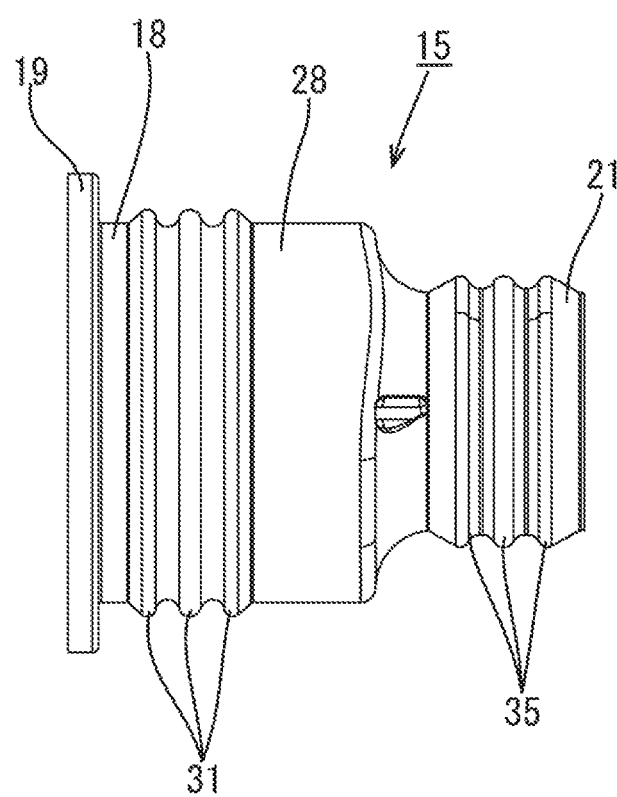
FIG. 11 is a plan view illustrating the rubber stopper.
Figure 12:
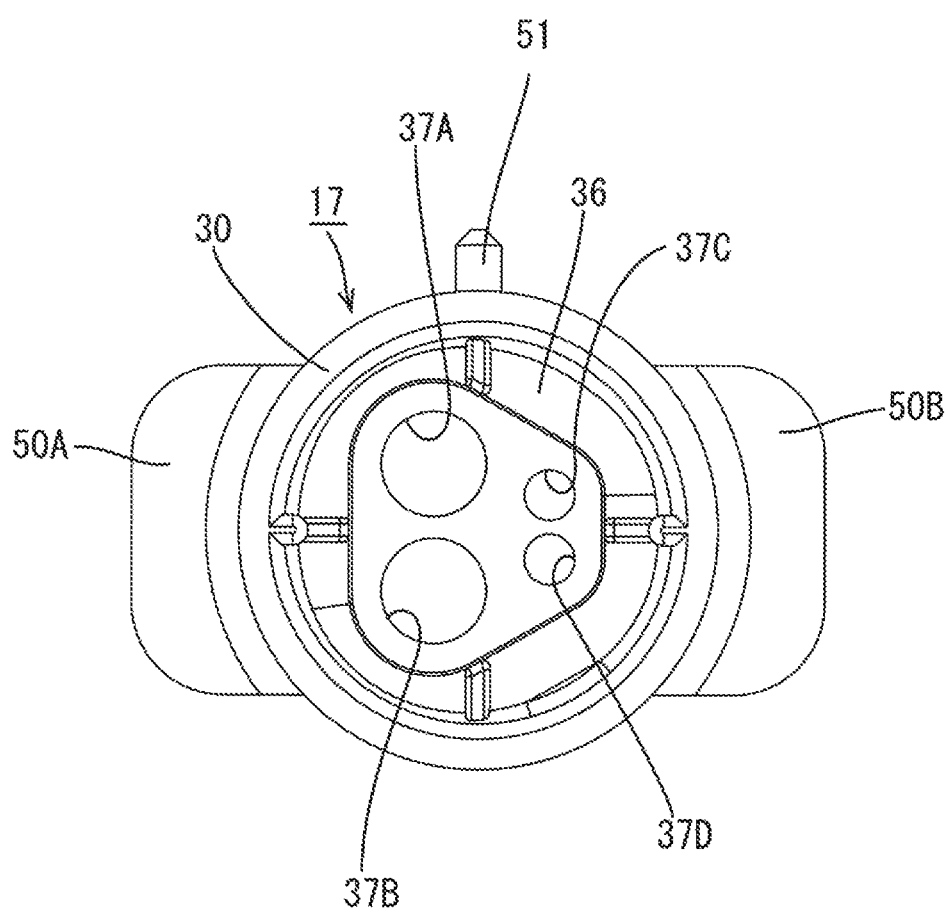
FIG. 12 is a rear view illustrating a cap.

The cap 17 includes a large diameter portion 30 that is fitted on the sheath fitting portion 18 of the rubber stopper 15 at a portion closer to the opening edge of the cap 17 (on the left in FIG. 3). As illustrated in FIG. 12, the large diameter portion 30 has a cross section in a round shape along an outline of the sheath fitting portion 18. An inner periphery of the large diameter portion 30 is in close contact with large diameter portion-side lips 31 formed on the outer periphery of the sheath fitting portion 18 (three lips in this embodiment). As illustrated in FIGS. 10 and 11, the large diameter portion-side lips 31 protrude outward from the outer periphery of the sheath fitting portion 18. Furthermore, the large diameter portion-side lips 31 are formed along the circumferential direction of the sheath fitting portion 18. With the large diameter portion-side lips 31 and the inner periphery of the large diameter portion 30 of the cap 17 in close contact with each other, space between the large diameter portion 30 of the cap and the sheath fitting portion 18 of the rubber stopper 15 is sealed.

As illustrated in FIGS. 6 and 12, when the large diameter portion 30 of the cap 17 is fitted on the sheath fitting portion 18 of the rubber stopper 15, the large diameter portion 30 presses the sheath fitting portion 18 inward in the diameter direction of the sheath fitting portion 18. According to the configuration, the sheath fitting portion 18 is pressed against the outer periphery of the sheath 14 from the outer side and thus the sheath-side lips 20 of the sheath 14 are properly in close contact with the outer periphery of the sheath 14.

As illustrated in FIGS. 3 and 4, the cap 17 includes a small diameter portion 34 inside the cap 17 at a position farther from the opening of the cap 17 than the large diameter portion 30 (on the right in FIG. 3). The small diameter portion 34 is fitted on the wire through portion 21 of the rubber stopper 15. An outer diameter of the small diameter portion 34 is smaller than the outer diameter of the large diameter portion 30. As illustrated in FIG. 12, the small diameter portion 34 has a cross section in a trapezoidal shape with round corners along the outline of the wire through portion 21.

As illustrated in FIGS. 3 and 4, an inner periphery of the small diameter portion 34 is in close contact with small diameter portion-side lips 35 formed on the outer periphery of the wire through portion 21 (three lips in this embodiment). As illustrated in FIGS. 10 and 11, the small diameter portion-side lips 35 protrude outward from the outer periphery of the wire through portion 21. Furthermore, the small diameter portion-side lips 35 are formed along the circumferential direction of the wire through portion 21. With the small diameter portion-side lips 35 and the inner periphery of the small diameter portion 34 of the cap 17 in close contact with each other, space between the small diameter portion 34 of the cap 17 and the wire through portion 21 of the rubber stopper 15 is sealed.

As illustrated in FIGS. 3 and 4, when the small diameter portion 34 of the cap 17 is fitted on the wire through portion 21 of the rubber stopper 15, the small diameter portion 34 presses the wire through portion 21 inward in the radial direction of the wire through portion 21. According to the configuration, the wire through portion 21 is compressed from the outer side. Therefore, the first to the fourth electric wire-side lips 26A, 26B, 26C and 26D formed on the inner periphery of the first to the fourth through holes 22A, 22B, 22C and 22D are properly in close contact with the outer peripheries of the first to the fourth electric wires 13A, 13B, 13C and 13D, respectively.

Figure 13:
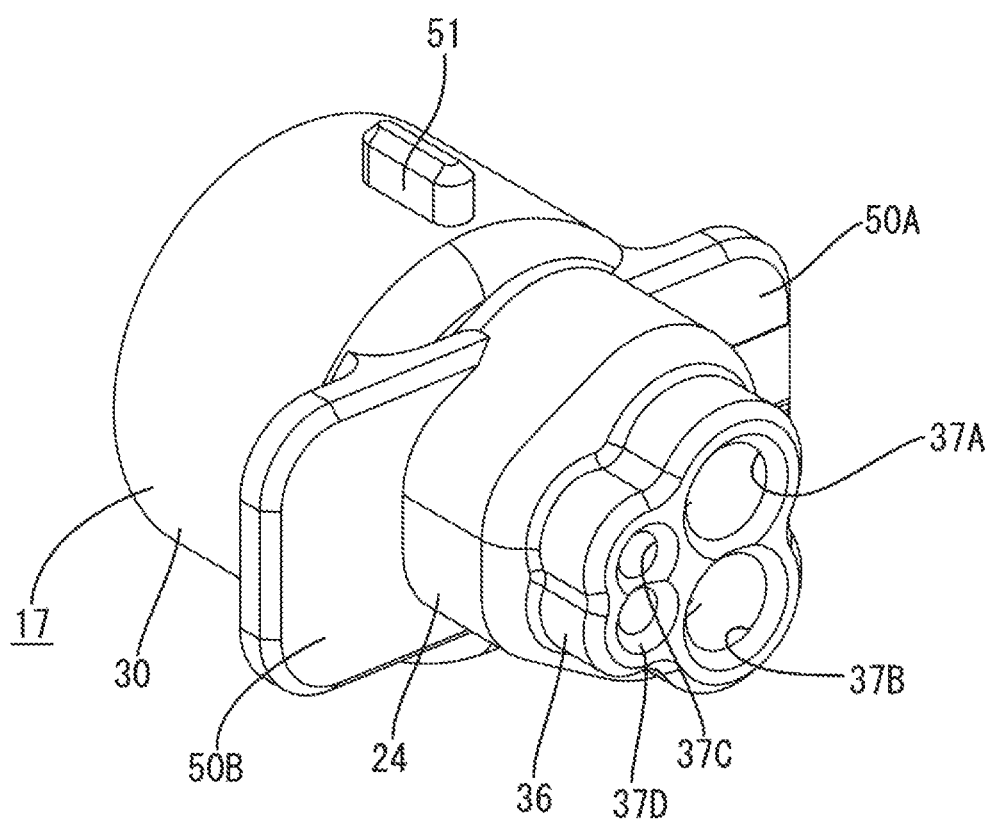
FIG. 13 is a perspective view illustrating the cap.

As illustrated in FIGS. 3 and 4, the cap 17 includes a back wall 36 at a position opposite from the opening of the cap 17. As illustrated in FIG. 13, a first outlet 37A, a second outlet 37B, a third outlet 37C, and a fourth outlet 13D through which the first electric wire 13A, the second electric wire 13B, the third electric wire 13C, and the fourth electric wire 13D are pulled out, respectively, run through the back wall 36.

As illustrated in FIGS. 3 and 4, the first to the fourth through holes 22A, 22B, 22C and 22D formed in the rubber stopper 15 are aligned with the first to the fourth outlets 37A, 37B, 37C and 37D formed in the cap 17, respectively. More specifically, the first through hole 22A is aligned with the first outlet 37A, the second through hole 22B is aligned with the second outlet 37B, the third through hole 22C is aligned with the third outlet 37C, and the fourth through hole 22D is aligned with the fourth outlet 37D.

As illustrated in FIG. 7, the cap 17 includes two holding protrusions 50A and 50B that protrude outward from the outer surface of the small diameter portion 34 in the radial direction of the small diameter portion 34. The holding protrusion 50A of the two holding protrusions 50A and 50B protrudes on a side closer to the long side 23 of the small diameter portion 34 and the other holding protrusion 50B protrudes on a side closer to the short side 24 of the small diameter portion 34. The two holding protrusions 50A and 50B have plate shapes and substantially rectangular overall shapes (see FIG. 7).

As illustrated in FIG. 6, the cap 17 includes rotation stopper protrusion 51 that protrudes upward from the outer periphery of the large diameter portion 30. The rotation stopper protrusion 51 has a rib shape that extends in a direction in which the large diameter portion 30 opens (in the horizontal direction in FIG. 2).

Guide Member 16

Figure 14:
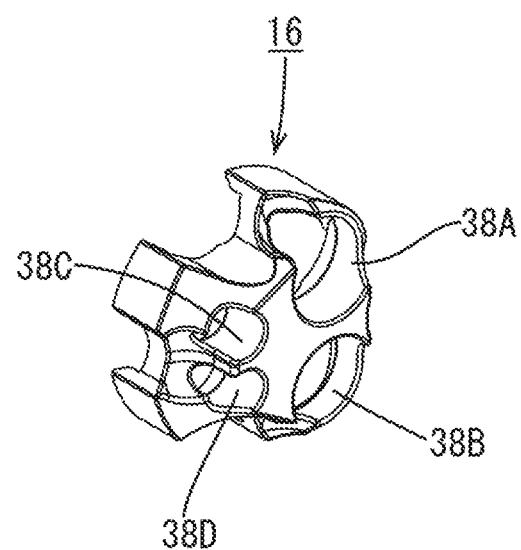
FIG. 14 is a perspective view illustrating a guide member.
Figure 15:
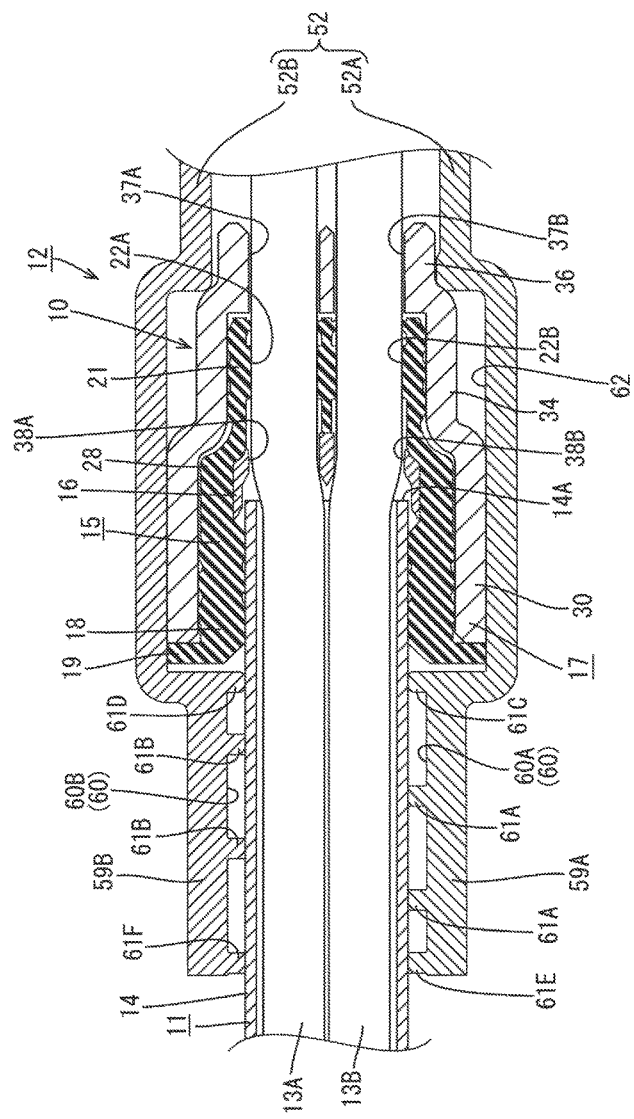
FIG. 15 is a cross-sectional view illustrating a sealing structure of the multicore cable.

As illustrated in FIG. 14, the guide member 16 made of synthetic resin includes the first guide hole 38A through which the first electric wire 13A is passed, the second guide hole 38B through which the second electric wire 13B is passed, the third guide hole 38C through which the third electric wire 13C is passed, and the fourth guide hole 38D through which the fourth electric wire 13D is passed. The first guide hole 38A, the second guide hole 38B, the third guide hole 38C, and the fourth guide hole 38D run through the guide member 16.

As illustrated in FIGS. 3 and 4, the first to the fourth through holes 22A, 22B, 22C and 22D of the rubber stopper 15 are aligned with the first to the fourth guide holes 38A, 38B, 38C and 38D of the guide member 16, respectively. More specifically, the first through hole 22A is aligned with the first guide hole 38A, the second through hole 22B is aligned with the second guide hole 38B, the third through hole 22C is aligned with the third guide hole 38C, and the fourth through hole 22D is aligned with the fourth guide hole 38D, respectively.

Holder 52

Figure 17:
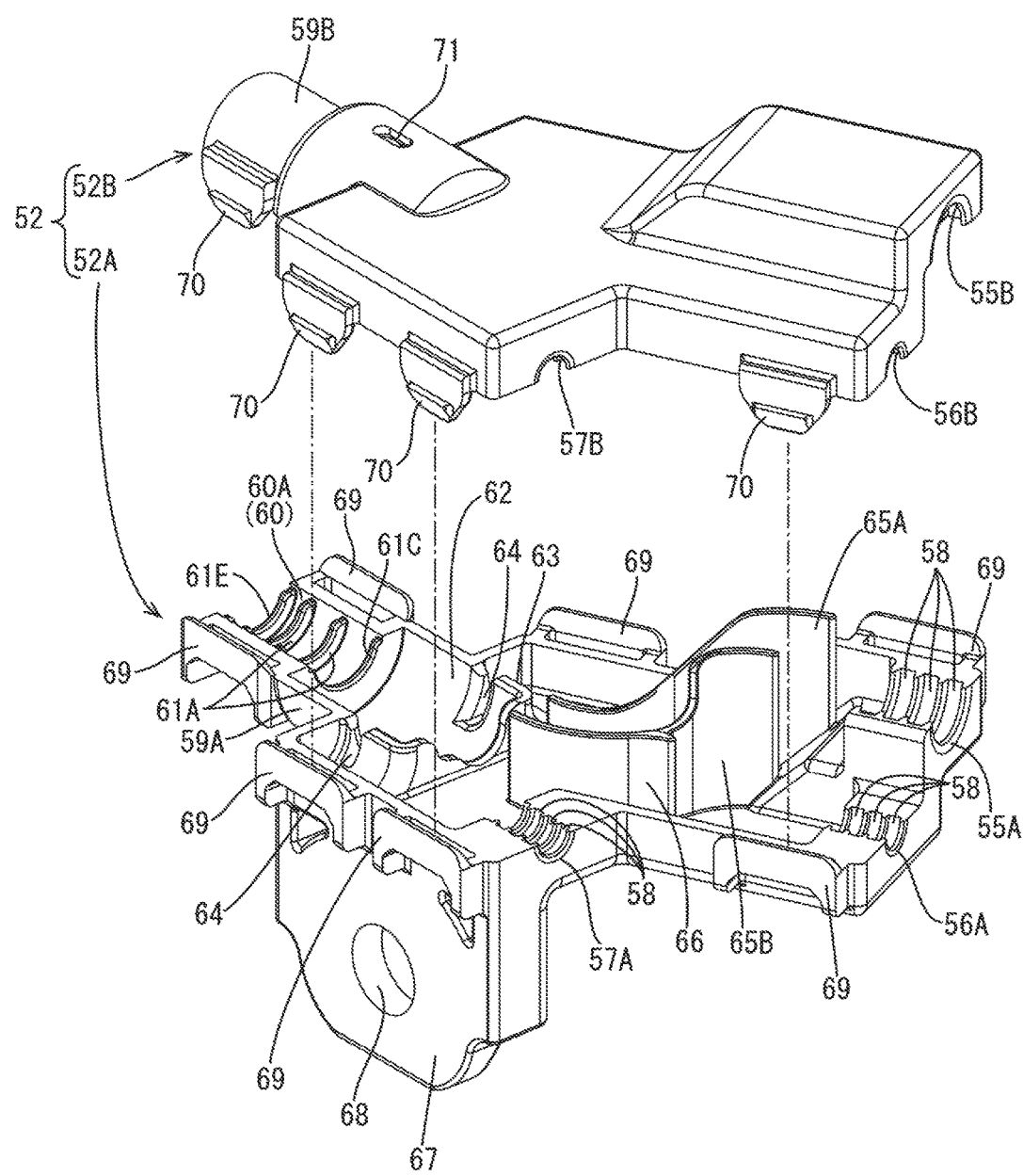
FIG. 17 is an exploded perspective view of the lower holder and an upper holder.

As illustrated in FIG. 17, the holder 52 includes the lower holder 52A (an example of a first holder) and an upper holder 52B (an example of a second holder) fitted to the lower holder 52A.

Lower Holder 52A

Figure 20:
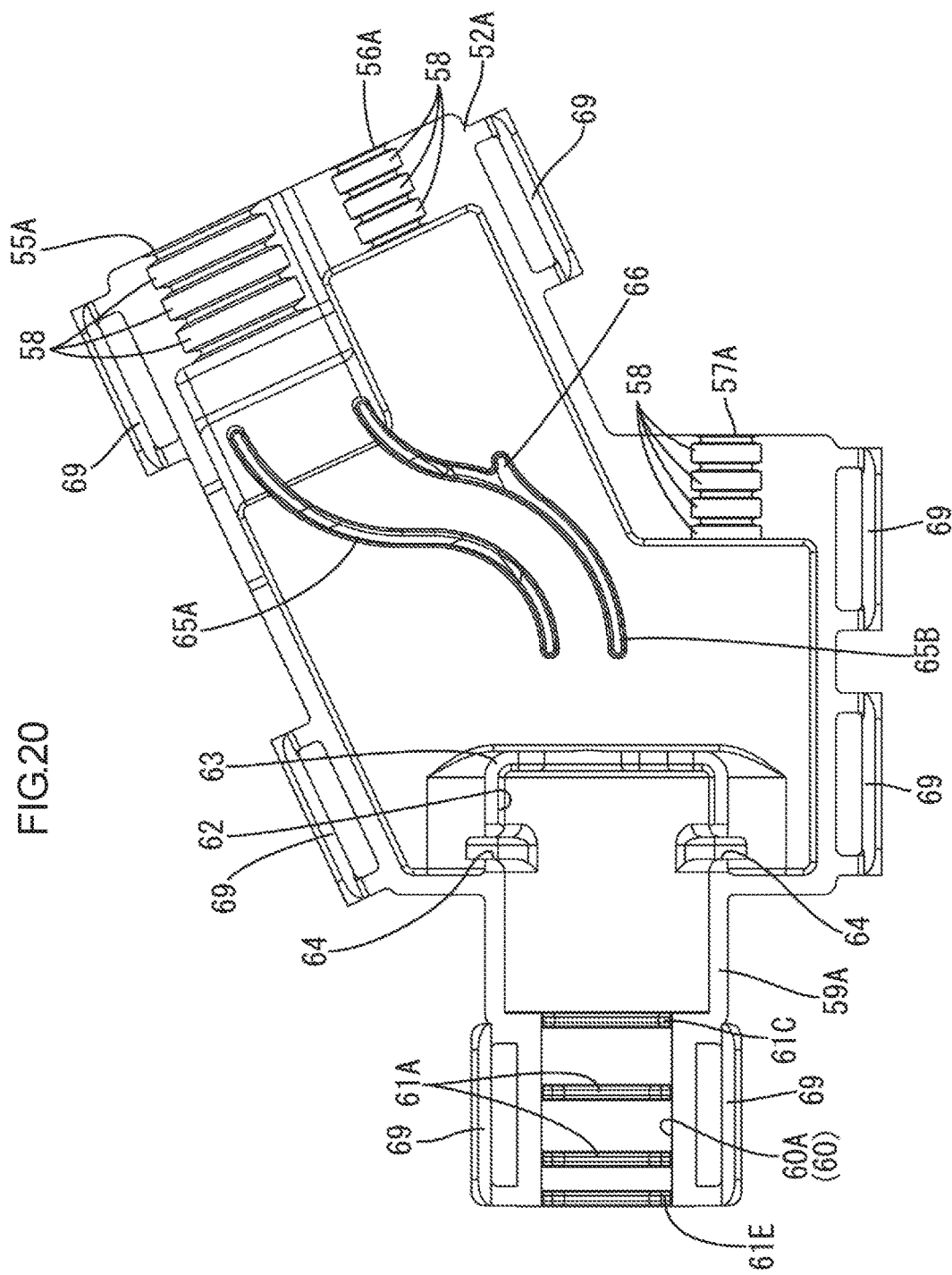
FIG. 20 is a plan view illustrating the lower holder.
Figure 21:
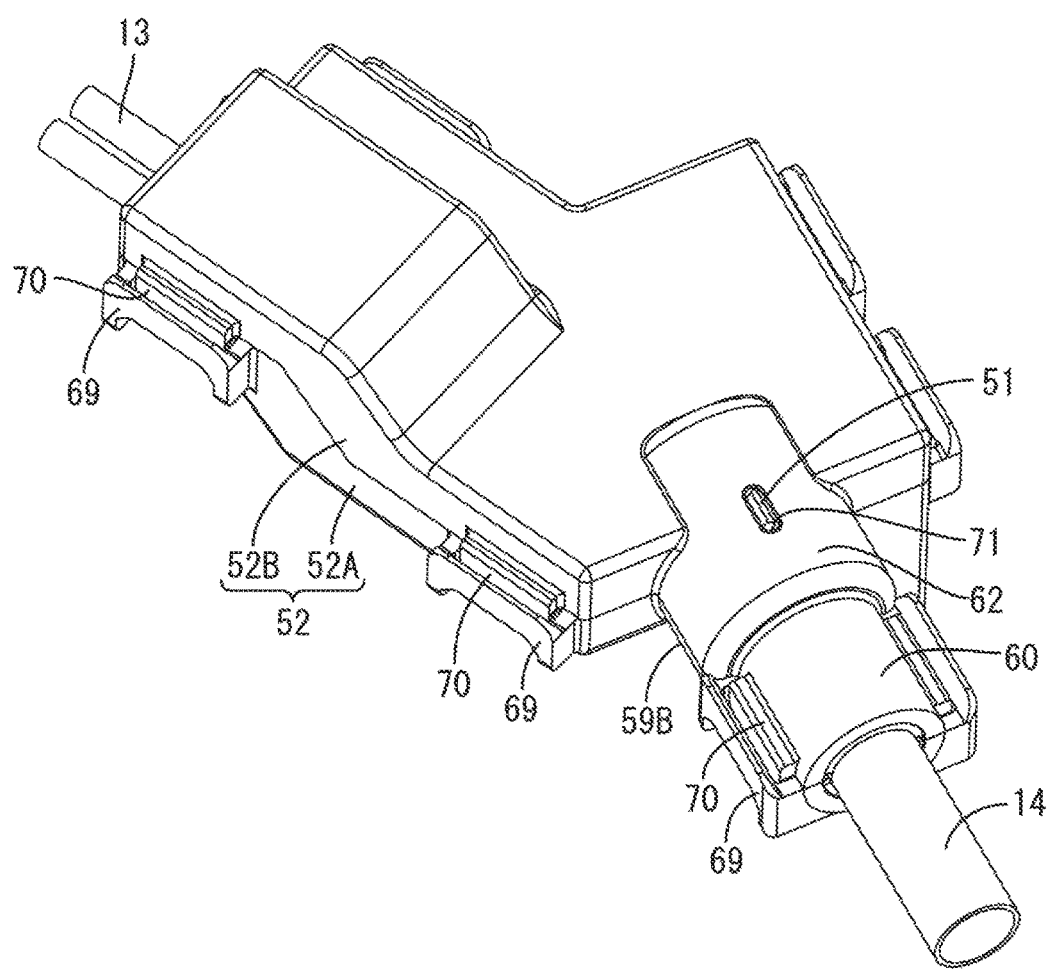
FIG. 21 is a perspective view illustrating finished forms of the holder and the multicore cable.

As illustrated in FIGS. 17 and 20, the lower holder 52A includes a bottom wall and sidewalls that project upward from edges of the bottom wall. The sidewalls include a motor wire outlet 55A and a sensor wire outlet 56A that are half round recesses with openings. The first electric wire 13A and the second electric wire 13B are pulled out through the motor wire outlet 55A. The third electric wire 13C and the fourth electric wire 13D are pulled out through the sensor wire outlet 56A. The sidewall other than the sidewalls that includes the motor wire outlet 55A and the sensor wire outlet 56A includes an auxiliary outlet 57A that are a half round recess with an opening for an electric wire configured to be connected to a device other than a motor and a sensor (not illustrated).

Holding grooves 58 are formed in inner peripheries of the motor wire outlet 55A, the sensor wire outlet 56A and the auxiliary outlet 57A for holding corrugated tubes that are not illustrated.

The sidewall of the lower holder 52A other than the sidewalls that include the motor wire outlet 55A, the sensor wire outlet 56A, and the auxiliary outlet 57A includes an extending portion 59A that projects outward. The extending portion 59A has a cross section that is substantially semicircular. At a portion of the extending portion 59A closer to a distal end thereof, a first sheath holding portion 60A for holding the sheath 14 of the multicore cable 11 is formed.

The first sheath holding portion 60A is formed such that an inner diameter thereof is slightly larger than the outer diameter of the sheath 14 with a substantially semicircular cross section. First holding ribs 61A are formed on an inner periphery of the first sheath holding portion 60A. The first holding ribs 61A protrude inward and extend along the circumferential direction thereof (the circumferential direction of the sheath 14 when the sheath 14 is placed). The first holding ribs 61A (two in this embodiment) are arranged away from each other in a direction in which the extending portion 59A extends (a direction in which the sheath 14 extends).

At an end of the first sheath holding portion 60A closer to a base of the extending portion 59A (closer to a cap holding portion 62 that will be described later), a first position guide rib 61C is formed. The first position guide rib 61C protrudes inward and extends along the circumferential direction of the first sheath holding portion 60A. The first position guide rib 61C is for guiding and holding a portion of the sheath 14 which is pulled out of the rubber stopper 15 and in a pull-out position in a proper position.

Furthermore, at an end of the first sheath holding portion 60A closer to a distal end of the extending portion 59A, a first end rib 61E is formed. The first end rib 61E protrudes inward and extends along the circumferential direction of the first sheath holding portion 60A.

The first holding ribs 61A, the first position guide rib 61C, and the first end rib 61E are parallel to one another and in contact with the outer periphery of the sheath 14 from the lower side in FIG. 17.

The cap holding portion 62 for holding the cap 17 is formed in a portion of the extending portion 59A closer to the sidewall to a portion of the lower holder 52A slightly inner than the extending portion 59A. The cap holding portion 62 includes a partition 63 at a portion of the lower holder 52A inner than the sidewall. The partition 63 protrudes upward from the bottom wall. The small diameter portion 34 of the cap 17 is held in space surrounded by the partition 63. The partition 63 includes stopper grooves 64 that extend downward from upper edges of the partition 63. The stopper grooves 64 are located at positions corresponding to the holding protrusions 50A and 50B of the cap 17 when the cap 17 is placed inside the partition 63. The holding protrusions 50A and 50B are inserted into the stopper grooves 64.

When the cap 17 is placed inside the partition 63, the holding protrusions 50A and 50B are inserted in the stopper grooves 64. According to the configuration, the holding protrusions 50A and 50B are in contact with the inner surface of the stopper grooves 64 from a thickness direction of the holding protrusions 50A and 50B. Therefore, shifting of a relative position between the cap 17 and the holder 52 is less likely to occur.

The stopper grooves 64 are formed in a portion of the partition 63 slightly inner than the sidewall of the lower holder 52A. According to the configuration, a force applied to the cap 17 is received by the sidewall of the lower holder 52A.

A width of each stopper groove 64 is defined equal to or slightly larger than a thickness of the holding protrusions 50A and 50B. At opening edges of the stopper grooves 64, sloped surfaces for guiding the holding protrusions 50A and 50B are formed such that the openings are widened toward the tops.

Figure 16:
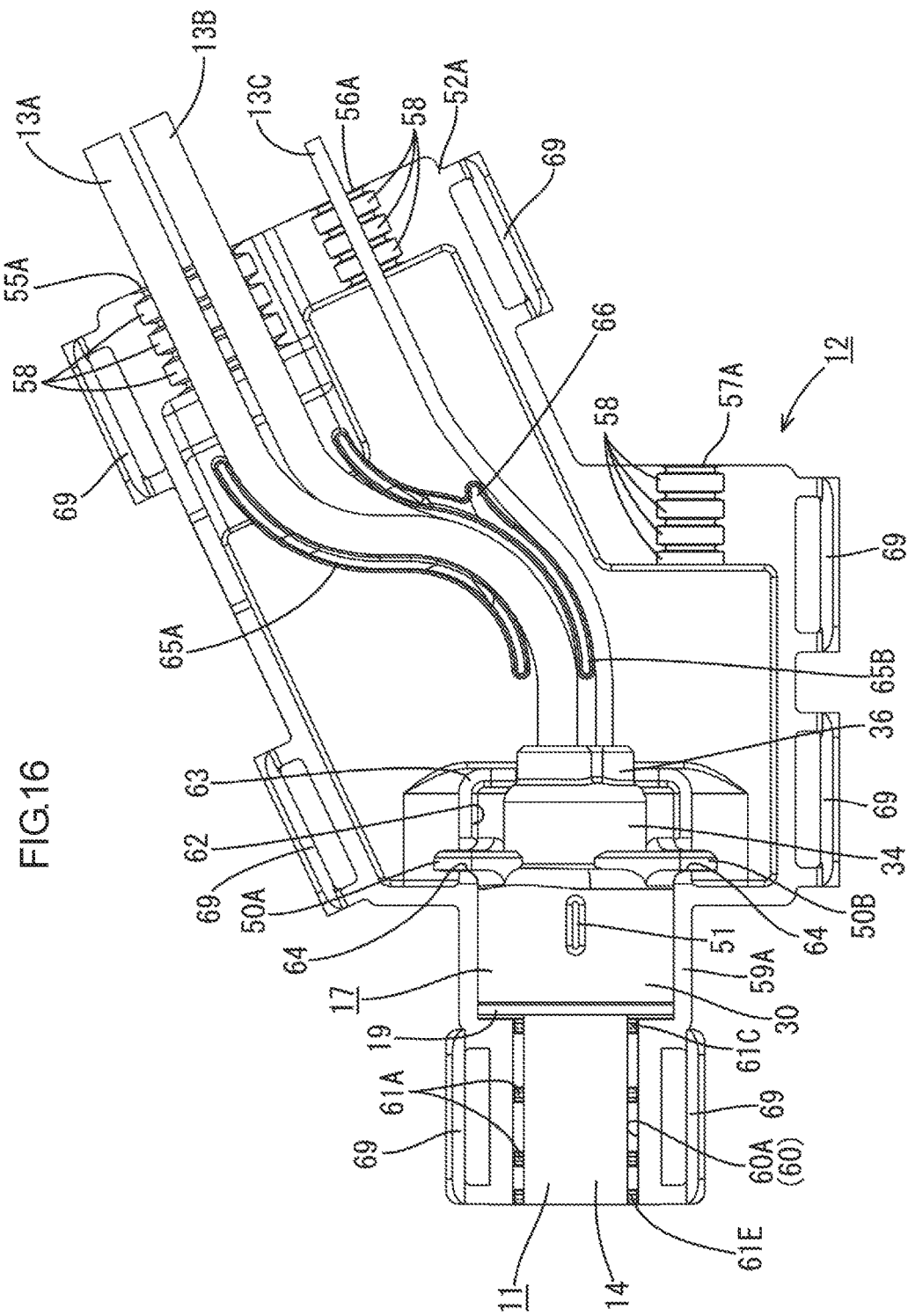
FIG. 16 is a plan view illustrating the multicore cable fitted in a lower holder with the sealing member attached to the multicore cable.

As illustrated in FIGS. 16, 17 and 20, a first wire routing portion 65A and a second wire routing portion 65B are formed in the bottom wall of the lower holder 52A for guiding the first to the fourth electric wires 13A, 13B, 13C and 13D pulled out through the first to the fourth through holes 22A, 22B, 22C and 22D of the rubber stopper 15 to predefined routing paths. The first wire routing portion 65A and the second wire routing portion 65B are formed in wall shapes so as to project upward from the bottom wall. The second wire routing portion 65B is located closer to the sensor wire outlet 56A.

The first wire routing portion 65A and the second wire routing portion 65B are gently curved from positions adjacent to the cap holding portion 62 to positions adjacent to the motor wire outlet 55A. The first wire routing portion 65A and the second wire routing portion 65B are formed in substantially S shapes when viewed from above. The first electric wire 13A and the second electric wire 13B are held between the first wire routing portion 65A and the second wire routing portion 65B. According to the configuration, the first electric wire 13A and the second electric wire 13B are routed in the routing path from the cap 17 to the motor wire outlet 55A.

The second wire routing portion 65B includes a guide protrusion 66 that extends toward the sensor wire outlet 56A at a position adjacent to the sensor wire outlet 56A. The third electric wire 13C and the fourth electric wire 13D pulled out of the cap 17 are guided by the second wire routing portion 65B and the guide protrusion 66 when contacted and routed in the routing path from the cap 17 to the sensor wire outlet 56A.

A bracket 67 is formed on the sidewall of the lower holder 52A so as to project downward. The bracket 67 includes a bolt insertion hole 68 that is a through hole. When a bolt (not illustrated) is inserted into the bolt insertion hole 68 and fixed to the vehicle, the holder 52 is fixed to the vehicle.

Upper Holder 52B

As illustrated in FIG. 17, the upper holder 52B includes a top wall and sidewalls that project downward from edges of the top wall. The sidewalls of the upper holder 52B include lock receptacles 70 at positions corresponding to locks 69 formed on the sidewalls of the lower holder 52A. The locks 69 and the lock receptacles 70 are elastically engaged with each other. As a result, the lower holder 52A and the upper holder 52B are fitted together.

The sidewalls of the upper holder 52B include a motor wire outlet 55B, a sensor wire outlet 56B, an auxiliary outlet 57B, and an extending portion 59B formed at positions corresponding to the motor wire outlet 55A, the sensor wire outlet 56A, the auxiliary outlet 57A, and the extending portion 59A of the lower holder 52A, respectively.

A second sheath holding portion 60B is formed at the extending portion 59B of the upper holder 52B at a position corresponding to the first sheath holding portion 60A when the lower holder 52A and the upper holder 52B are fitted together (see FIG. 15). A combination of the first sheath holding portion 60A and the second sheath holding portion 60B forms the sheath holding portion 60 of the holder 52.

The second sheath holding portion 60B is formed such that an inner diameter thereof is slightly larger than the outer diameter of the sheath 14 with a substantially semicircular cross section. Two of second holding ribs 61B are formed on an inner periphery of the second sheath holding portion 60B. The second holding ribs 61B protrude inward and extend along the circumferential direction thereof (the circumferential direction of the sheath 14 when the sheath 14 is placed). The second holding ribs 61B are arranged at positions such that the second holding ribs 61B and the first holding ribs 61A of the lower holder 52A are staggered when the lower holder 52A and the upper holder 52B are fitted together (see FIG. 15).

At an end of the second sheath holding portion 60B closer to a base of the extending portion 59B (closer to the cap holding portion 62 that will be described later), a second position guide rib 61D is formed. The second position guide rib 61D protrudes inward and extends along the circumferential direction of the second sheath holding portion 60B. The second position guide rib 61D is arranged at a position opposite the first position guide rib 61C of the lower holder 52A. When the lower holder 52A and the upper holder 52B are fitted together, the second position guide rib 61D continues to the first position guide rib 61C.

Furthermore, at an end of the second sheath holding portion 60B closer to a distal end of the extending portion 59B, a second end rib 61F is formed. The second end rib 61F protrudes inward and extends along the circumferential direction of the second sheath holding portion 60B. The second end rib 61F is arranged at a position opposite the first end rib 61E of the lower holder 52A. When the lower holder 52A and the upper holder 52B are fitted together, the second end rib 61F continues to the first end rib 61E.

The first holding rib 61A, the second holding rib 61B, the first position guide rib 61C, the second position guide rib 61D, the first end rib 61E and the second end rib 61F have heights from the first sheath holding portion 60A or the second sheath holding portion 60B similar to one another.

The heights of the ribs 61A to 61F are defined such that the ribs 61A to 61F are in contact with the outer periphery of the sheath 14 so as to slightly press them when the lower holder 52A and the upper holder 52B are fitted together. According to the configuration, the sheath 14 is properly held in the sheath holding portion 60 and thus shifting of a relative position between the multicore cable 11 and the holder 52 is less likely to occur (see FIG. 15).

Especially, the first and the second position guide ribs 61C and 61D are in contact with and pressed against an entire area of the outer periphery of the sheath 14 at the same position with respect to the extending direction of the sheath 14 and adjacent to the portion of the sheath 14 pulled out of the rubber stopper 15. According to the configuration, the portion of the sheath 14 pulled out of the rubber stopper 15 and in the pull-out position is held in the proper position without crooked.

The extending portion 59B of the upper holder 52B includes a rotation stopper hole 71 that is a through hole (see FIG. 17). The rotation stopper hole 71 is formed at a position corresponding to the rotation stopper protrusion 51 of the cap 17 when the cap 17 is held in the cap holding portion 62. The rotation stopper protrusion 51 is inserted in the rotation stopper hole 71 and the rotation stopper protrusion 51 is in contact with an inner periphery of the rotation stopper hole 71. According to the configuration, rotation of the cap 17 in the circumferential direction of the large diameter portion 30 of the cap 17 inside the cap holding portion 62 is restricted.

With the rotation stopper hole 71 formed in the upper holder 52B, the cap 17 (the sealing member 10) is properly positioned in the vertical direction relative to the holder 52. Therefore, alignment of the first to the fourth electric wires 13A, 13B, 13C and 13D pulled out of the cap 17 relative to the first wire routing portion 65A and the second wire routing portion 65B is easily performed.

Production Process

Next, an example of a production process of this embodiment will be described. The production process of this embodiment is not limited to the following.

First, the sheath of the multicore cable 11 is stripped by a known method. As a result, the first to the fourth electric wires 13A, 13B, 13C and 13D project from the end 14A of the sheath 14.

Figure 18:
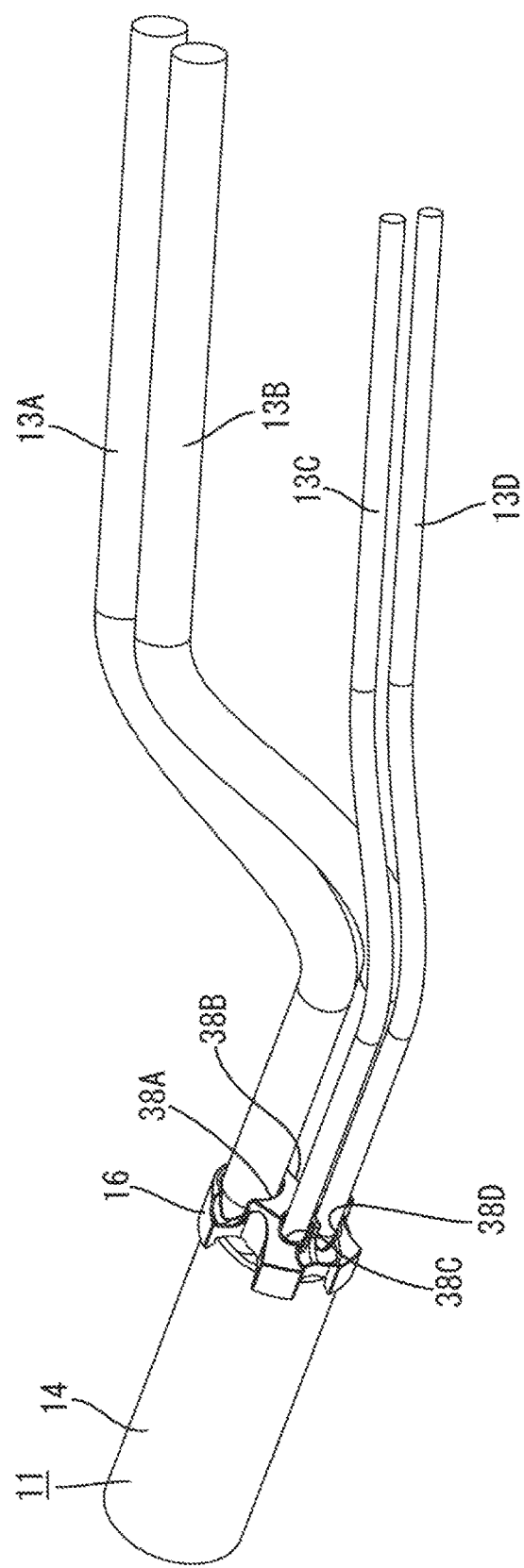
FIG. 18 is a perspective view illustrating the guide member attached to the electric wires of the multicore cable with a sheath stripped.

Next, as illustrated in FIG. 18, the first to the fourth electric wires 13A, 13B, 13C and 13D are inserted in the first to the fourth guide holes 38A, 38B, 38C and 38D of the guide member 16, respectively. Specifically, the first electric wire 13A is inserted in the first guide hole 38A, the second electric wire 13B is inserted in the second guide hole 38B, the third electric wire 13C is inserted in the third guide hole 38C, and the fourth electric wire 13D is inserted in the fourth guide hole 38D.

Next, the first to the fourth electric wires 13A, 13B, 13C and 13D are inserted in the first to the fourth through holes 22A, 22B, 22C and 22D of the rubber stopper 15, respectively. Specifically, the first electric wire 13A is inserted in the first through hole 22A, the second electric wire 13B is inserted in the second through hole 22B, the third electric wire 13C is inserted in the third through hole 22C, and the fourth electric wire 13D is inserted in the fourth through hole 22D. After that, the rubber stopper 15 is moved to the guide member 16.

Figure 19:
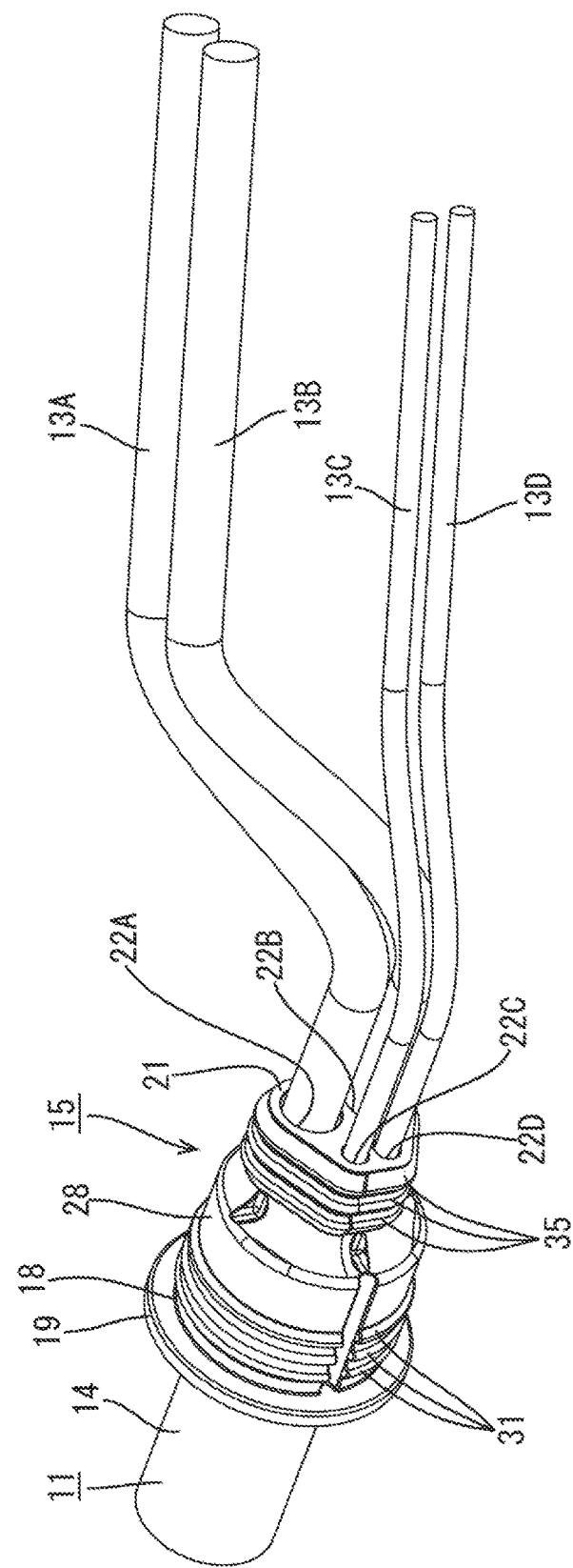
FIG. 19 is a perspective view illustrating a rubber stopper fitted on an end of the sheath of the multicore cable.

Next, the relative position between the rubber stopper 15 and the guide member 16 is adjusted such that the first to the fourth through holes 22A, 22B, 22C and 22D of the rubber stopper 15 are aligned with the first to the fourth guide holes 38A, 38B, 38C and 38D of the guide member 16, respectively. After that, as illustrated in FIG. 19, the rubber stopper 15 is moved to the end 14A of the sheath 14 and the sheath fitting portion 18 of the rubber stopper 15 is fitted on the end 14A of the sheath 14.

Next, the first to the fourth electric wires 13A, 13B, 13C and 13D are inserted in the first to the fourth outlets 37A, 37B, 37C and 37D of the cap 17, respectively. Specifically, the first electric wire 13A is inserted in the first outlet 37A, the second electric wire 13B is inserted in the second outlet 37B, the third electric wire 13C is inserted in the third outlet 37C, and the fourth electric wire 13D is inserted in the fourth outlet 37D. After that, the cap 17 is moved to the rubber stopper 15 fitted on the end 14A of the sheath 14.

Next, the relative position between the rubber stopper 15 and the cap 17 is adjusted such that the first to the fourth through holes 22A, 22B, 22C and 22D of the rubber stopper 15 are aligned with the first to the fourth outlets 37A, 37B, 37C and 37D of the cap 17, respectively. With the first to the fourth through holes 22A, 22B, 22C and 22D of the rubber stopper 15 aligned with the first to the fourth outlets 37A, 37B, 37C and 37D of the cap 17, respectively, the cap 17 is fitted on the rubber stopper 15. After that, the cap 17 is pushed until the cap is brought into contact with the flange 19 of the rubber stopper 15 (see FIG. 1).

Next, as illustrated in FIG. 16, the sheath 14 of the multicore cable 11 is placed on the first sheath holding portion 60A of the lower holder 52A and the cap 17 is placed on the cap holding portion 62 with the rotation stopper protrusion 51 of the cap 17 projecting upward such that the holding protrusions 50A and 50B are inserted in the stopper grooves 64 from above. As a result, the cap 17 is held so as not to move relative to the lower holder 52A.

Next, the first electric wire 13A and the second electric wire 13B pulled out of the cap 17 are placed between the first wire routing portion 65A and the second wire routing portion 65B and routed to the motor wire outlet 55A. The third electric wire 13C and the fourth electric wire 13D pulled out of the cap 17 are routed along the second wire routing portion 65B and the guide protrusion 66 and then to the sensor wire outlet 56A.

Next, the upper holder 52B is fitted to the lower holder 52A from above. The upper holder 52B and the lower holder 52A are fitted together with the locks 69 elastically engaged with the lock receptacles 70 (see FIGS. 15 and 21).

When the holder 52 is assembled as described above, the first holding ribs 61A, the second holding ribs 61B, the first position guide rib 61C, the second position guide rib 61D, the first end rib 61E, and the second end rib 61F are in contact with and pressed against the outer periphery of the sheath 14. According to the configuration, the sheath 14 is held still in the sheath holding portion 60.

Especially, the first position guide rib 61C and the second position guide rib 61D are in contact with and pressed against an entire area of the outer periphery of the sheath 14 at the same position with respect to the extending direction of the sheath and adjacent to the portion of the sheath 14 pulled out of the rubber stopper 15. According to the configuration, the portion of the sheath 14 pulled out of the rubber stopper 15 and in the pull-out position is held in the proper position without crooked. Namely, the relative position between the multicore cable 11 and the holder 52 is less likely to shift.

The sealing structure 12 of the multicore cable 11 is complete through the process above.

Functions and Effects of this Embodiment

Next, functions and effects of this embodiment will be described. The sealing structure 12 of the multicore cable 11 according to this embodiment includes the multicore cable 11, the rubber stopper 15, the cap 17, and the holder 52. The multicore cable 11 includes first to the fourth electric wires 13A, 13B, 13C and 13D that are covered with the sheath. The rubber stopper 15 is fitted on the end 14A of the sheath 14. The rubber stopper 15 includes the first to the fourth through holes 22A, 22B, 22C and 22D through which the first to the fourth electric wires 13A, 13B, 13C and 13D are passed. The cap 17 is fitted on the rubber stopper 15 and presses the rubber stopper 15 inward. The holder 52 includes the sheath holding portion 60 for holding the sheath 14 and the cap holding portion 62 for holding the cap 17.

In this embodiment, because the sheath 14 is held by the sheath holding portion 60 and the cap 17 is held by the cap holding portion 62, the relative position between the sheath 14 and the cap 17 is maintained. Therefore, the rubber stopper 15 is properly pressed against the sheath 14 and the first to the fourth electric wires 13A, 13B, 13C and 13D by the cap 17. As a result, the branching area of the multicore cable 11 at which the first to the fourth electric wires 13A, 13B, 13C and 13D branch is properly sealed.

In this embodiment, the holder 52 includes the first wire routing portion 65A and the second wire routing portion 65B for guiding the first to the fourth electric wires 13A, 13B, 13C and 13D pulled out through the first to the second through holes 22A, 22B, 22C and 22D, respectively, to the predefined routing paths. The first to the fourth electric wires 13A, 13B, 13C and 13D pulled out through the first to the fourth through holes 22A, 22B, 22C and 22D formed in the rubber stopper 15 are properly routed to the predefined positions with the first wire routing portion 65A and the second wire routing portion 65B. According to the configuration, the first to the fourth electric wires 13A, 13B, 13C and 13D are less likely to twist or tangle. Therefore, unnecessary forces are applied to the first to the fourth electric wires 13A, 13B, 13C and 13D and the space between the first to the fourth electric wires 13A, 13B, 13C and 13D and the rubber stopper 15 is properly sealed.

In this embodiment, because the sheath holding portion 60 includes the holding ribs 61A and 61B that protrude inward, the sheath 14 are pressed by the holding ribs 61A and 61B and properly held in the sheath holding portion 60. Namely, a level of sealing between the electric wires 13 and the rubber stopper 15 increases.

The holder 52 is assembled from the lower holder 52A and the upper holder 52B. The branching portion of the multicore cable 11 including the sheath 14 and the cap 17 at which the first to the fourth electric cables 13A, 13B, 13C and 13D are branched off is disposed at a predetermined position in the lower holder 52A and sandwiched between the lower holder 52A and the upper holder 52B. The branching portion is easily fitted to the holder 52.

The first holding ribs 61A and the second holding ribs 61B are arranged so as to be staggered when the lower holder 52A and the upper holder 52B are fitted together. Therefore, the sheath 14 is disposed so as to slightly winds in the sheath holding portion 60 and thus the sheath 14 is more properly held in the sheath holding portion 60.

When the sheath 14 is arranged in the sheath holding portion 60 so as to wind, a force may be applied to a portion of the sheath 14 which is pulled out of the rubber stopper 15. As a result the portion of the sheath 14 in the pull-out position may be crooked (see FIG. 23). If the sheath 14 is crooked relative to the rubber stopper 15, the level of sealing between the sheath 14 and the rubber stopper 15 and the level of sealing between the electric wires 13 and the rubber stopper 15 may decrease.

In this embodiment, the first position guide rib 61C and the second position guide rib 61D are formed at the end of the sheath holding portion 60 closer to the cap holding portion 62. According to the configuration, the portion of the sheath 14 around a portion of the rubber stopper 15 at which the sheath 14 is pulled out of the rubber stopper 15 is pressed by the first position guide rib 61C and the second position guide rib 61D. The portion of the sheath 14 pulled out of the rubber stopper 15 and in the pull-out position is guided and held in the proper position. Therefore, the level of sealing between the sheath 14 and the rubber stopper 15 is properly maintained.

In this embodiment, the holder 52 includes the bracket 67 configured to be mounted to the vehicle. With the bracket 67, the holder 52 is less likely to vibrate even if the vehicle vibrates during driving. According to the configuration, in the space between the sheath 14 held by the sheath holding portion 60 of the holder 52 and the cap 17 held by the cap holding portion 62 of the holder 52, the sheath 14, the first to the fourth electric wires 13A, 13B, 13C and 13D, the rubber stopper 15, and the cap 17 are less likely to vibrate differently from one another. Therefore, the space between the sheath 14 and the rubber stopper 15 and the space between the first to the fourth electric wires 13A, 13B, 13C and 13D and the rubber stopper 15 are properly sealed.

Embodiment 2

Figure 22:
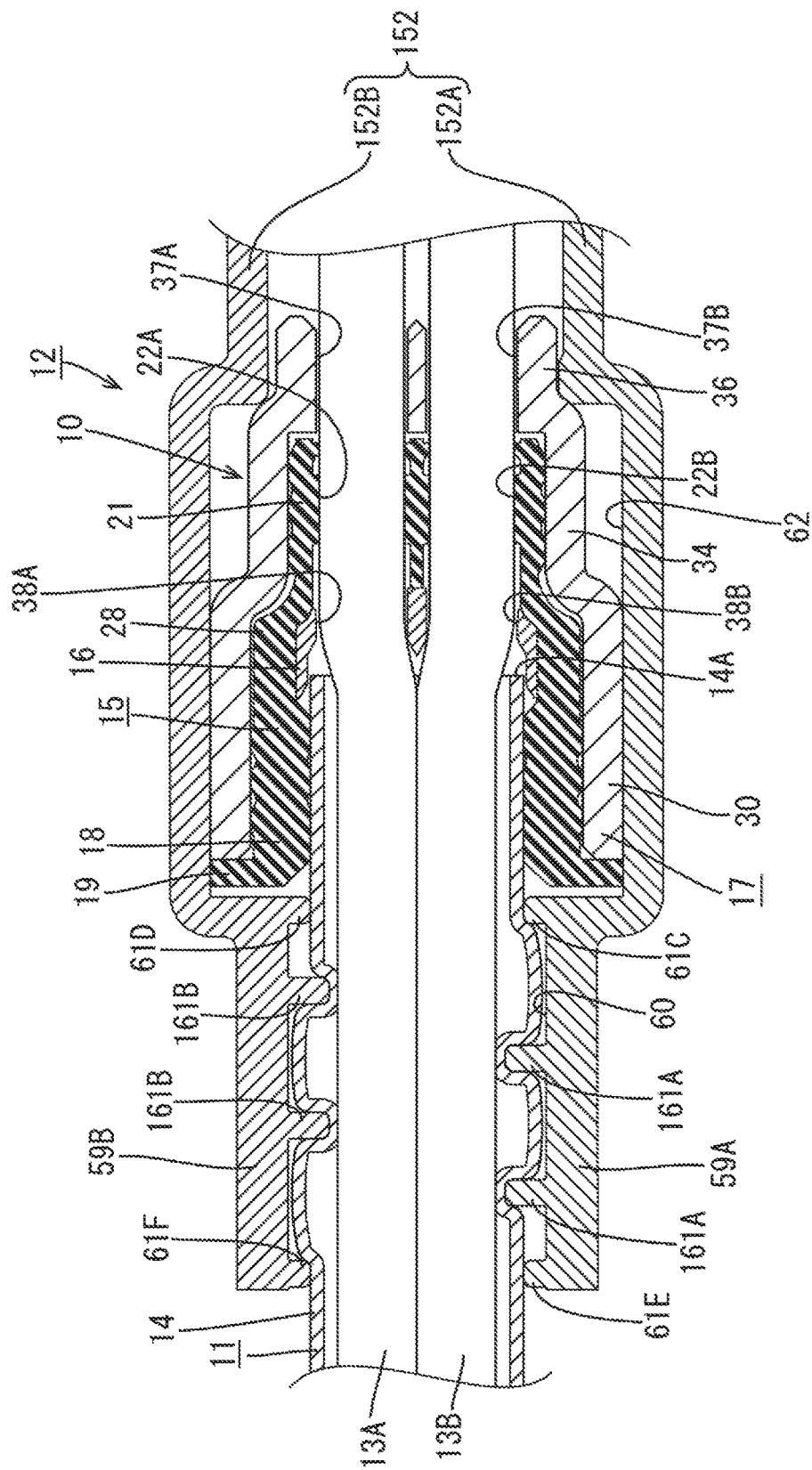
FIG. 22 is a cross-sectional view of a multicore cable according to Embodiment 2 of the present invention.

Next, Embodiment 2 of the present invention will be described with reference to FIGS. 22 and 23. Configurations different from Embodiment 1 will be described. Components similar to those in Embodiment 1 will be indicated by the same numerals and the descriptions thereof will not be repeated.

The sealing structure 12 of the multicore cable 11 in this embodiment includes first holding ribs 161A and second holding ribs 161B that have heights from the inner wall of the sheath holding portion 60 higher than those in Embodiment 1. This is different from Embodiment 1.

When the multicore cable 11 is held with such a holder 152, the sheath 14 of the multicore cable 11 may be firmly pressed by the holding ribs 161A and 161B and deformed. As a result, the sheath 14 may press down the electric wires 13 resulting in bent wires as illustrated in FIG. 22.

Figure 23:
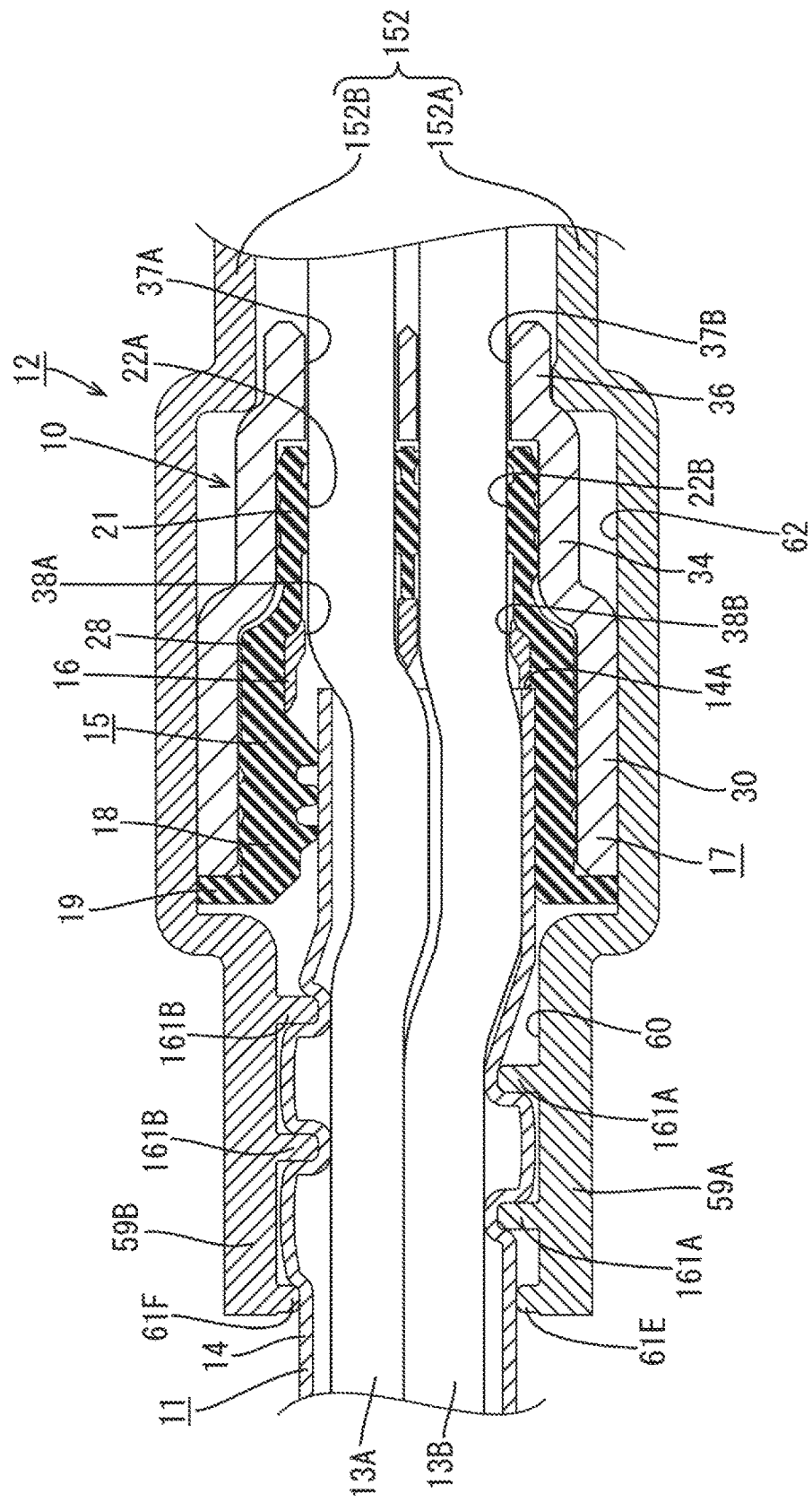
FIG. 23 is a cross-sectional view illustrating a sealing structure of a multicore cable of a reference example.

If the sheath holding portion 60 does not include the position guide ribs 61C and 61D although the sheath 14 may be firmly pressed against the holding ribs 161A and 161B, the sheath 14 (the multicore cable 11) may be arranged in the sheath holding portion 60 so as to wind as illustrated in FIG. 23 and a force may be applied to the portion of the sheath 14 which is pulled out of the rubber stopper 15. As a result, the portion in the pull-out position may be crooked. If the sheath 14 (the multicore cable 11) is crooked relative to the rubber stopper 15, the level of sealing between the rubber stopper 15 and the sheath 14 and the level sealing between the rubber stopper 15 and the electric wires 13 may decrease.

For such a problem, this embodiment is configured that the first position guide rib 61C and the second position guide rib 61D are provided at the end of the sheath holding portion 60 closer to the cap holding portion 62. According to the configuration, a portion of the sheath 14 around a portion of the rubber stopper 15 at which the sheath 14 is pulled out of the rubber stopper 15 is pressed by the first position guide rib 61C and the second position guide rib 61D. The sheath 14 in the pull-out position is guided and held in the proper position. Therefore, a level of the sealing between the sheath 14 and the rubber stopper 15 is properly maintained.

Other Embodiments

The present invention is not limited to the embodiments, which have been described using the foregoing descriptions and the drawings. For example, embodiments as described below are also encompassed within the technical scope of the present invention.

The cap 17 may be screwed to the holder 52. The cap 17 may be fixed to the holder 52 by inserting a boss formed on the holder 52 into a through hole formed in the cap 17, by heating a tip of the boss, and by applying a pressure to the tip to deform. Alternatively, the cap 17 and the holder 52 may be fixed together with a rivet. Namely, the cap 17 may be fixed to the holder with a known method.

The holder 52 may include a single wire routing portion or three or more wire routing portions. Alternatively, the holder 52 may not include the wire routing portion.

In this embodiment, the wire routing portions are formed so as to protrude from the bottom wall of the lower holder 52A in the forms of walls. However, the wire routing portions are not limited to such a configuration. The wire routing portions may be in a form of column that protrudes from the bottom wall of the lower holder 52A. Shapes of cross sections of the wire routing portions may be circles, ovals, ellipses, triangles, rectangles, or polygons.

In this embodiment, the holder 52 includes one bracket 67. However, the holder 52 may include two or more brackets 67. Alternatively, the holder 52 does not include the bracket 67.

The multicore cable 11 may include two or three electric wires or five or more electric wires.

The electric wires include the electric wires having two different outer diameters. However, the electric wires may include electric wires having three or more different outer diameters.

All of the outer diameters of the electric wires may be the same.

The electric wires may be sealed electric wires. Each electric wire may be a twisted wire that includes thin metal wires that are twisted together. Alternatively, each electric wire may be a single core wire that includes a metal bar as a core. Any electric wire may be selected as appropriate for such an electric wire.

The multicore cable 11 may be a cabtire cable or a multicore sealed cable that includes electric wires with outer peripheries covered with a sealed layer. Any multicore cable may be selected as appropriate for the multicore cable 11.

The sealing member 10 according to this embodiment can seal any kind of liquid as appropriate such as water, oil, and organic solution.

The sealing structure 12 of the multicore cable 11 according to this embodiment may be mounted to the vehicle in any position as appropriate.

The sheath holding portion 60 may not include the holding ribs 61A and 61B, the position guide ribs 61C and 61D, and the end ribs 61E and 61F. All or some of those may be omitted.

The positions and the number of the holding ribs 61A and 61B are not limited to those in the above embodiments and can be altered as appropriate. For example, they may be arranged at positions on the lower holder 52A and the upper holder 52B opposed to each other.

Alternatively, the sheath may be arranged so as to wind in the sheath holding portion 60 with the holding ribs 61A and 61B, the heights of which are altered.

The position guide ribs 61C and 61D may be arranged in a portion of the sheath holding portion 60 adjacent to the end rather than at the end. Namely, they may be arranged at any position as long as the portion of the sheath 14 which is pulled out of the rubber stopper and is guided and held in the proper position.

LIST OF REFERENCE NUMERALS

11: Multicore cable
12: Sealing structure
13A: First electric wire
13B: Second electric wire
13C: Third electric wire
13D: Fourth electric wire
14: Sheath
15: Rubber stopper
17: Cap
22A: First through hole
22B: Second through hole
22C: Third through hole
22D: Fourth through hole
52: Holder
52A: Lower holder (First holder)
52B: Upper holder (Second holder)
60: Sheath holding portion
60A: First sheath holding portion
60B: Second sheath holding portion
61A: First holding rib
61B: Second holding rib
61C: First position guide rib
61D: Second position guide rib
61E: First end rib
61F: Second end rib
62: Cap holding portion
65A: First wire routing portion
65B: Second wire routing portion
67: Bracket The following aspects are preferable for embodiments of the technique described in the specification.

It is preferable that the holder includes a wire routing portion for guiding the electric wires pulled out through the through holes.

With the above-mentioned embodiment, it is possible to properly route the electric wires pulled out through the through hole formed in the rubber stopper to a predefined position with the wire routing portion. Therefore, the electric wires are less likely to twist or tangle. As a result, an unnecessary force is less likely to be applied to the electric wires and space between the electric wires and the rubber stopper is properly sealed.

It is preferable that the holder includes a bracket configured to be mounted to a vehicle.

With the above-mentioned embodiment, it is possible to restrict the holder from vibrating even when the vehicle vibrates during driving. Therefore, in the space between the portion of the sheath held with the sheath holding portion of the holder and the cap held with the cap holding portion of the holder, the sheath, the electric wires, the rubber stopper, and the cap are less likely to differently vibrate. As a result, space between the sheath and the rubber stopper and space between the electric wires and the rubber stopper are properly sealed.

It is preferable that the sheath holding portion includes a holding rib that protrudes inward and extends along a circumferential direction of the sheath when the sheath is place in the sheath holding portion.

According to such a configuration, the sheath is pressed by the holding rib and properly fixed in the sheath holding portion.

It is preferable that the holder includes a first holder and a second holder fitted together, the sheath holder portion includes a first sheath holding portion included in the first holder and a second sheath holding portion includes in the second holder, and the holding rib includes a first holding rib formed on the first holding portion and a second holding rib formed on the second holding portion.

According to such a configuration, it is possible to easily perform attachment of the branching portion of the multicore cable around the branching point at which the electric wires are branched off including the sheath and the cap to the holder because it requires only sandwiching the branching portion between the first holder and the second holder.

It is preferable that the first holding rib and the second holding rib are arranged so as to be staggered when the first holder and the second holder are fitted together.

According to the configuration, the sheath is arranged so as to wind in the sheath holding portion and thus the sheath is further properly fixed in the sheath holding portion.

It is preferable that at an end of the sheath holding portion closer to the cap holding portion or a portion of the sheath holding portion adjacent to the end closer to the cap holding portion, position guide ribs are formed at portions of the first sheath holding portion and the second sheath holding portion that are opposed to each other so as to protrude inward and extend along a circumferential direction of the sheath when the sheath is placed in the sheath holding portion.

According to such a configuration, the portion of the sheath which is pulled out of the rubber stopper and in a pull-out position is guided and held in a proper position with the position guide ribs. Therefore, it is possible to reduce a decrease in level of intimate contact between the sheath and the rubber stopper due to crook of the portion of the sheath 14 in the pull-out position and thus the level of sealing between the sheath and the rubber stopper further improves.

With the aspects of the present invention, it is possible to improve the level of sealing of the branching portion of the multicore cable at which the electric wires are branched off.

The invention claimed is:
1. A sealing structure of a multicore cable, comprising:
the multicore cable including a plurality of electric wires covered with a sheath;
a rubber stopper fitted on an end of the sheath and including a plurality of through holes through which the plurality of electric wires are passed, respectively;
a cap fitted on the rubber stopper and pressing the rubber stopper inward; and
a holder including a first holder and a second holder fitted together, the holder including a tubular sheath holding portion accommodating the sheath therein and a tubular cap holding portion accommodating the cap therein, wherein the tubular sheath holding portion is defined by a first sheath holding portion of the first holder and a second sheath holding portion of the second holder, wherein at an end of the tubular sheath holding portion closer to the tubular cap holding portion or a portion of the tubular sheath holding portion adjacent to the end closer to the tubular cap holding portion, position guide ribs are formed at portions of the first sheath holding portion and the second sheath holding portion that are opposed to each other, wherein the position guide ribs protrude radially inward from an inner wall of the first sheath holding portion and an inner wall of the second sheath holding portion and are configured to extend along a circumferential direction of the sheath when the sheath is placed in the tubular sheath holding portion.

2. The sealing structure of a multicore cable according to claim 1, wherein the holder includes a wire routing portion for guiding the plurality of electric wires pulled out through the plurality of the through holes.

3. The sealing structure of a multicore cable according to claim 1, wherein the holder includes a bracket configured to be mounted to a vehicle.

4. The sealing structure of a multicore cable according to claim 1, wherein the sheath holding portion includes a holding rib that protrudes radially inward and is configured to extend along a circumferential direction of the sheath when the sheath is placed in the sheath holding portion.

5. The sealing structure of a multicore cable according to claim 4, wherein the holding rib includes a first holding rib formed on the first holding portion and a second holding rib formed on the second holding portion.

6. The sealing structure of a multicore cable according to claim 5, wherein the first holding rib and the second holding rib are arranged so as to be staggered when the first holder and the second holder are fitted together.

7. The sealing structure of a multicore cable according to claim 1, wherein the sheath holding portion includes an end rib that protrudes radially inward and is configured to extend along a circumferential direction of the sheath when the sheath is placed in the sheath holding portion.

8. The sealing structure of a multicore cable according to claim 7, wherein the end rib includes a first end rib formed on the first holding portion and a second end rib formed on the second holding portion, the end rib being axially spaced apart from the position guide ribs in a longitudinally extending direction of the sheath holding portion.

* * * * *

UNITED STATES PATENT AND TRADEMARK OFFICE
CERTIFICATE OF CORRECTION

| | |
|---|---|
| PATENT NO. | : 9,905,337 B2 |
| APPLICATION NO. | : 15/317290 |
| DATED | : February 27, 2018 |
| INVENTOR(S) | : H. Komori et al. |

It is certified that error appears in the above-identified patent and that said Letters Patent is hereby corrected as shown below:

On the Title Page

Assignees (Line 1), please change "AUTONETOWRKS" to -- AUTONETWORKS --.

Signed and Sealed this
Twentieth Day of November, 2018

Andrei Iancu
*Director of the United States Patent and Trademark Office*